(12) United States Patent
Arakawa et al.

(10) Patent No.: US 9,124,868 B2
(45) Date of Patent: Sep. 1, 2015

(54) 3D ENCODING APPARATUS

(71) Applicant: Panasonic Corporation, Osaka (JP)

(72) Inventors: Hiroshi Arakawa, Nara (JP); Takahiro Nishi, Nara (JP); Kiyofumi Abe, Osaka (JP); Hideyuki Ohgose, Osaka (JP); Koji Arimura, Osaka (JP); Yuki Maruyama, Osaka (JP); Katsuki Urano, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 297 days.

(21) Appl. No.: 13/768,339

(22) Filed: Feb. 15, 2013

(65) Prior Publication Data

US 2013/0162770 A1 Jun. 27, 2013

Related U.S. Application Data

(63) Continuation of application No. PCT/JP2011/004358, filed on Aug. 1, 2011.

(30) Foreign Application Priority Data

Aug. 18, 2010 (JP) .................................. 2010-182690

(51) Int. Cl.
*H04N 13/00* (2006.01)
*H04N 19/597* (2014.01)
(Continued)

(52) U.S. Cl.
CPC ......... *H04N 13/0048* (2013.01); *H04N 19/152* (2014.11); *H04N 19/177* (2014.11); *H04N 19/597* (2014.11)

(58) Field of Classification Search
CPC ............ H04N 19/597; H04N 13/0048; H04N 19/177; H04N 19/152
See application file for complete search history.

(56) References Cited

U.S. PATENT DOCUMENTS 7,526,031 B2 * 4/2009 Toma et al. .............. 375/240.26
2007/0171976 A1 7/2007 Toma et al.
(Continued)

FOREIGN PATENT DOCUMENTS

JP 2001-069530 3/2001
JP 2007-012218 1/2007
(Continued)

OTHER PUBLICATIONS

International Preliminary Report on Patentability and Written Opinion of the International Searching Authority mailed Mar. 28, 2013 in International (PCT) Application No. PCT/JP2011/004358.
(Continued)

*Primary Examiner* — Behrooz Senfi
*Assistant Examiner* — Maria Vazquez Colon
(74) *Attorney, Agent, or Firm* — Wenderoth, Lind & Ponack, L.L.P.

(57) ABSTRACT

A 3D encoding apparatus encodes an input image and generates and outputs a three dimensional stream including a basic stream and an extended stream including a plurality of image groups. A 3D encoding apparatus includes a setter that sets a specific delay value for each image group based on the a first delay value as a delay value of the basic stream and a second delay value as a delay value of the three dimensional stream. The setter sets the specific delay value to a value not more than smaller one of the first delay value and the second delay value. The first virtual buffer and the second virtual buffer perform the buffer simulation for n+1th image group based on information about the specific delay value of the nth image group set by the setter in the basic stream and three dimensional stream.

9 Claims, 11 Drawing Sheets

(51) Int. Cl.
*H04N 19/152* (2014.01)
*H04N 19/177* (2014.01)

(56) References Cited

U.S. PATENT DOCUMENTS

| | | | |
|---|---|---|---|
| 2008/0089428 A1* | 4/2008 | Nakamura et al. | 375/240.26 |
| 2009/0180758 A1 | 7/2009 | Toma et al. | |
| 2009/0214178 A1 | 8/2009 | Takahashi | |
| 2009/0274212 A1 | 11/2009 | Mizutani et al. | |
| 2010/0021139 A1 | 1/2010 | Toma et al. | |
| 2010/0046638 A1 | 2/2010 | Toma et al. | |
| 2010/0272174 A1* | 10/2010 | Toma et al. | 375/240.12 |

FOREIGN PATENT DOCUMENTS

| | | |
|---|---|---|
| JP | 2008-301532 | 12/2008 |
| JP | 2009-272706 | 11/2009 |

OTHER PUBLICATIONS

International Search Report issued Aug. 23, 2011 in International (PCT) Application No. PCT/JP2011/004358.
International Telecommunication Union, "Series H: Audiovisual and Multimedia Systems Infrastructure of audiovisual services—Coding of moving video—Advanced video coding for generic audiovisual services", ITU-T Telecommunication Standardization Sector of ITU, Recommendation ITU-T H.264, Mar. 2009, pp. i-650.

* cited by examiner

3D ENCODING APPARATUS

CROSS-REFERENCE TO RELATED APPLICATIONS

This is a continuation application of International Application No. PCT/JP2011/004358, with an international filing date of Aug. 1, 2011, which claims priority of Japanese Patent Application No.: 2010-182690 filed on Aug. 18, 2010, the content of which is incorporated herein by reference.

BACKGROUND

1. Technical Field

The present disclosure relates to a 3D encoding apparatus for encoding 3D video signals.

2. Related Art

JP-A-2008-301532 describes a generating apparatus for generating one or a plurality of encoding stream(s) including a plurality of encoded pictures per randomly accessible access unit. Concretely, the generating apparatus includes a first determination unit that determines a delay amount between decoding of a head picture in a decoding order and display of the head picture in a display order so that the delay amounts in any two access units at which decoding is carried out sequentially are equal to each other, and a generating unit that encodes a plurality of pictures included in the two access units so that the delay amount is one that is determined in the first determination unit and generates encoding streams. The generating apparatus limits the delay amount to a value not more than a predetermined value.

According to this configuration, encoding streams are generated so that the delay amounts (frame delay) in two access units (for example, clips) being target for special reproduction are equal to each other. For this reason, when those access units are sequentially decoded, a gap does not occur between the pictures at connecting points of the access units and a frame rate is constant. That is to say, the access units are connected seamlessly at the time of the special reproduction. As a result, discomfort that is caused by the gap can be eliminated for users who watch moving images on a basis of the access units.

SUMMARY

A standard for encoding input images into three-dimensional streams including basic streams and extended streams is H.264/MVC encoding standard. For example, the basic streams are obtained by encoding any one of a left image and a right image in a 3D video, and the extended streams are obtained by encoding the other image in the 3D video in view of a difference between the other image and the one image being taken into consideration. When input images to be input are encoded into three-dimensional streams including basic streams and extended streams, technical specification described in the BD standard (System Description Blu-ray Disc Read-Only Format part 3 Audio Visual Basic Specifications) should be met. Concretely, a delay value of a basic stream to be added to predetermined GOP (Group Of pictures) and a delay value of a three dimensional stream to be added to this GOP should be equal to each other. Further, the delay value of the basic stream to be added to predetermined GOP, a delay value of a three dimensional stream to be added to this GOP, and the delay value of the extended stream to be added to this GOP should be equal to each other.

The delay values are time from arrival of first byte of data (code) at a buffer of a decoder to drawing-out of data (code) of a head picture for a decoding process in the decoder from the buffer. The delay values depend on a code amount of the basic stream and the extended stream. Therefore, a quantization value for encoding of input images can be controlled so that the delay values of the basic stream and the extended stream are equal to each other.

However, in a method for controlling a quantization value, it is difficult to obtain suitable image quality. In order to control the quantization value so that the code amount of the basic stream and the extended stream are completely equal to each other, a configuration of a 3D encoding apparatus becomes complicated.

The present disclosure is devised in view of the above problem, and provides a three-dimensional encoding apparatus that is capable of making a delay value of a basic stream and a delay value of a three dimensional stream equal to each other in a simple configuration. Further, the present disclosure provides the three-dimensional encoding apparatus that is capable of making the delay value of the basic stream, the delay value of the three dimensional stream and a delay value of an extended stream equal to each other in a simple configuration.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

A 3D encoding apparatus according to the present disclosure includes an encoder that encodes an input image and generates and outputs a three dimensional stream including a basic stream and an extended stream including a plurality of image groups, a first virtual buffer that performs a buffer simulation of decoding the basic stream output from the encoder, a second virtual buffer that performs a buffer simulation of decoding the three dimensional stream output from the encoder, a first calculator that calculates a first delay value as a delay value of the basic stream for each image group based on a result of the buffer simulation performed by the first virtual buffer, a second calculator that calculates a second delay value as a delay value of the three dimensional stream for each image group based on a result of the buffer simulation performed by the second virtual buffer, and a setter that sets a specific delay value for each image group based on the calculated first delay value and second delay value. The setter sets the specific delay value to a value not more than smaller one of the first delay value and the second delay value. The first virtual buffer and the second virtual buffer perform the buffer simulation for n+1th image group based on information about the specific delay value of the nth image group set by the setter in the basic stream and three dimensional stream.

A 3D encoding apparatus having the above configuration can set a specific delay value based on a first delay value and a second delay value. The 3D encoding apparatus can feed back the set specific delay value to a simulation at a time of generating a basic stream (hereinafter, "first BS") and a simulation at a time of generating a three dimensional stream (hereinafter, "second BS"). Therefore, the 3D encoding apparatus can perform the first BS and the second BS on a next image group based on information about the same delay values. With the simple configuration, the first delay value and the second delay value can be made to be equal to each other.

Since the specific delay value is a value not more than the smaller one of the first delay value and the second delay value, even when the delay values of the first BS and the second BS are replaced by the same values so that the buffer simulation is performed, the basic stream and the three dimensional stream that meet the BD standard can be always generated without breaking the first BS and the second BS.

According to the 3D encoding apparatus of the present disclosure, the three-dimensional encoding apparatus that can make the delay value of the basic stream and the delay value of the three dimensional stream equal to each other can be provided by the simple configuration. Further, the three-dimensional encoding apparatus that can make the delay value of the basic stream, the delay value of the three dimensional stream and the delay value of the extended stream equal to each other can be provided by the simple configuration.

DETAILED DESCRIPTION

Hereinafter, a 3D encoding apparatus and a 3D encoding method according to embodiments of the present disclosure will be described in detail with reference to the drawings.

(First Embodiment)

1. Outline

The 3D encoding apparatus according to a first embodiment is an apparatus for encoding 3D video signals. The 3D encoding apparatus according to the first embodiment is an encoding apparatus for encoding input images and generating basic streams to be used for stereoscopic vision and extended streams different from basic videos. Further, virtual buffer control using only the basic streams and virtual buffer control using three dimensional streams where the basic streams and the extended streams are combined are made.

A characteristic of the 3D encoding apparatus is to obtain a specific delay value (hereinafter, "specific delay value") based on two delay values obtained by the two virtual buffer controls. The obtained specific delay value is used for the virtual buffer control at a time of encoding input images to be input after the obtaining of the delay values and generating the basic stream and the extended stream.

Hereinafter, one example of the specific delay value is the smaller one of the two delay values obtained by the virtual buffer controls. The specific delay value is not limited to this value, and a value that is smaller than the two delay values can be used.

The encoding method having a configuration using H.264/AVC will be described. The encoding method to be used is not limited to H.264/AVC, and another moving image encoding method may be used. That is to say, any encoding method may be used as long as it encodes an input image into the basic stream and the three dimensional stream.

2. Configuration

Hereinafter, the 3D encoding apparatus according to the first embodiment will be described with reference to the drawings.

Figure 1:
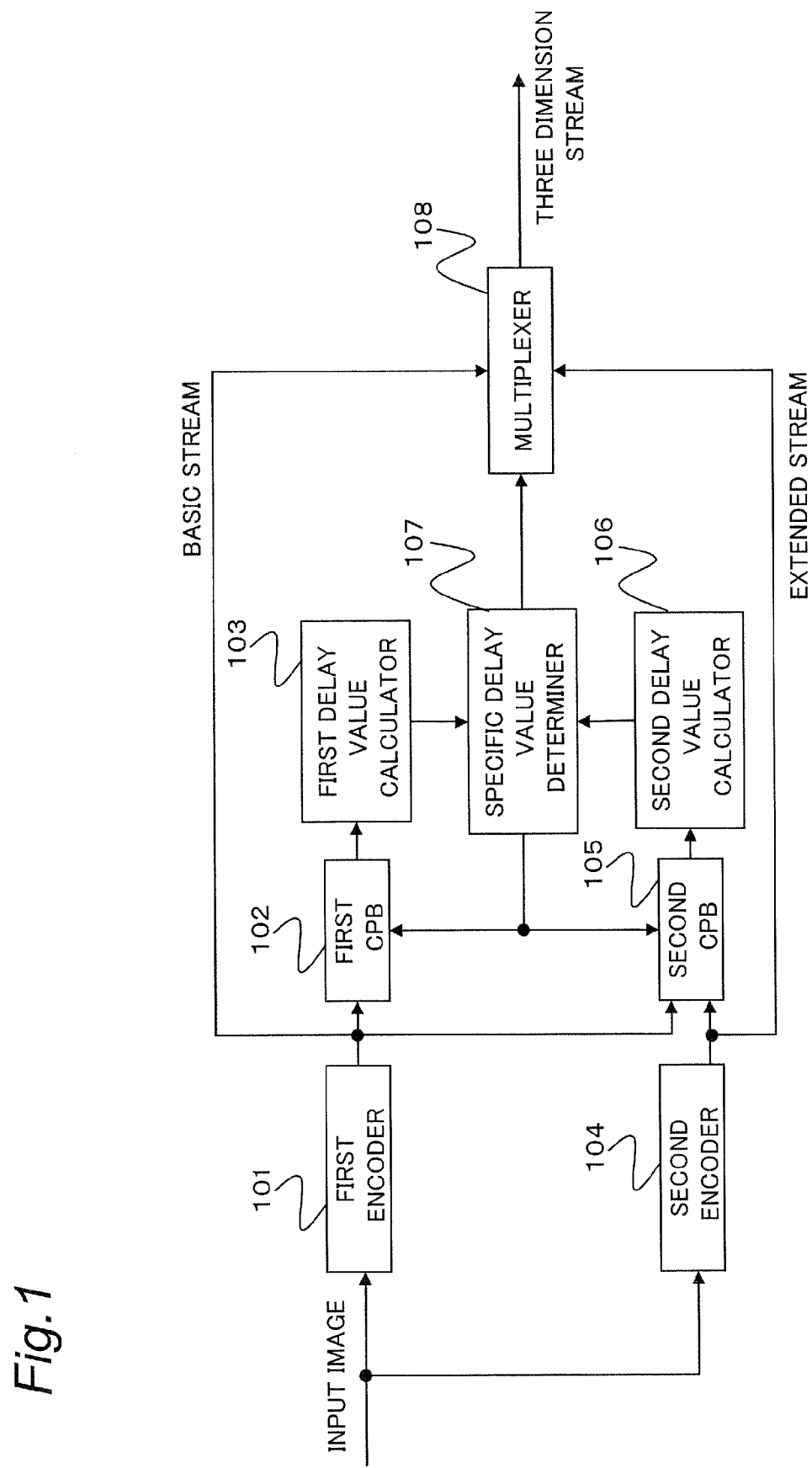
FIG. 1 is a diagram illustrating a configuration of a 3D encoding apparatus according to a first embodiment.

FIG. 1 is a diagram illustrating a configuration of the 3D encoding apparatus according to the first embodiment.

As shown in FIG. 1, the 3D encoding apparatus is provided with a first encoder 101, a first CPB 102, a first delay value calculator 103, a second encoder 104, a second CPB 105, a second delay value calculator 106, a specific delay value determiner 107 and a multiplexer 108. CPB is an abbreviated name of a Coded Picture Buffer.

The first encoder 101 encodes an input image to be input using H.264/AVC to generate a basic stream. The first encoder 101 outputs the generated basic stream to the multiplexer 108. Further, the first encoder 101 outputs an encoding parameter generated at the time of encoding the input image to the first CPB 102 and the second CPB 105. The first encoder 101 outputs a code amount at the time of encoding the input image into the basic stream to the first CPB 102 and the second CPB 105. When the input image is encoded into the basic stream, it is preferable that MVC (multi view coding) is employed.

The first CPB 102 is a virtual buffer for performing the virtual buffer control based on an encoding parameter and a code amount output from the first encoder 101. The encoding parameter represents information about encoding that includes syntax information. The first CPB 102 calculates time information $tai(n)$, $taf(n)$ and $tr,n(n)$ about basic streams based on the following six formulas. The first CPB 102 outputs the calculated time information to the first delay value calculator 103. The time information $tai(n)$, $taf(n)$ and $tr,n(n)$ and the following six formulas are defined by the H.264/AVC encoding standard. $tai(n)$ represents initial arrival time, namely, information about time of arrival of first data composing one picture at a decoder. $taf(n)$ represents final arrival time, namely, information about time of arrival of last data composing one picture at the decoder. $tr,n(n)$ represents nominal removal time, namely, information about time when data composing one picture is taken out from a buffer of the decoder.

$$taf(n)=tai(n)+b(n) \div \text{BitRate}[\text{SchedSelIdx}] \quad \text{(Formula 1)}$$

$$tai(n)=\text{Max}(taf(n-1), tai,\text{earliest}(n)) \quad \text{(Formula 2)}$$

$$tai,\text{earliest}(n)=tr,n(n)-(\text{initial\_cpb\_removal\_delay}\\ [\text{SchedSelIdx}] \text{ initial\_cpb\_removal\_delay\_offset}\\ [\text{SchedSelIdx}])\div 90000 \quad \text{(Formula 3)}$$

$$tai,\text{earliest}(n)=tr,n(n)-(\text{initial\_cpbremoval\_delay}\\ [\text{SchedSelIdx}] \div 90000) \quad \text{(Formula 4)}$$

$$tr,n(0)=\text{initial\_cpb\_removal\_delay}[\text{SchedSelIdx}]\\ 90000 \quad \text{(Formula 5)}$$

$$tr,n(n)=tr,n(nb)+tc*cpb\_\text{removal\_delay}(n) \quad \text{(Formula 6)}$$

b(n) represents a generated code amount of an nth input image of the basic stream. The encoding parameters in the above six formulas can be obtained in the encoding process of the first encoder 101.

The first CPB 102 performs the virtual buffer control using a specific delay value input from the specific delay value determiner 107. Concretely, the first CPB 102 assigns the specific delay value received from the specific delay value determiner 107 to initial_cpb_removal_delay in (Formula 4). The first CPB 102 calculates tai,earliest(n) and performs the subsequent virtual buffer control.

The first delay value calculator 103 calculates a delay value $\Delta tg, 90(n)$ per GOP based on time information calculated by the first CPB 102.

$$\Delta tg, 90(n) = 90000 * (tr, n(n) - taf(n-1)) \qquad \text{(Formula 7)}$$

The above formula is a formula that is defined by the H.264/AVC encoding standard.

The first delay value calculator 103 outputs the calculated delay value to the specific delay value determiner 107.

The second encoder 104 encodes an input image to be input based on the H.264/AVC standard, generates an extended stream, and outputs the generated extended stream to the multiplexer 108. The second encoder 104 outputs the encoding parameter generated at the time of encoding the input image to the second CPB 105. The second encoder 104 outputs a code amount at the time of encoding the input image into the extended stream to the second CPB 105. When the input image is encoded into the extended stream, it is preferable that MVC (multi view coding) is employed.

The second CPB 105 is a virtual buffer for performing the virtual buffer control based on the encoding parameter and the code amount output from the first encoder 101 and the second encoder 104. The second CPB 105 calculates the time information tai(n), taf(n) and tr,n(n) relating to a three dimensional stream based on the formula 1 to the formula 6. The second CPB 105 assigns the encoding parameter relating to the three dimensional stream to the formulas 1 to 6. b(n) represents a sum of a generated code amount of the nth input image in the extended stream and a generated code amount of the nth input image in the basic stream.

The second CPB 105 performs the virtual buffer control using the specific delay value input from the specific delay value determiner 107. The second CPB 105 assigns the specific delay value received from the specific delay value determiner 107 to initial_cpb_removal_delay in (Formula 4). The second CPB 105 calculates tai,earliest(n) and performs the subsequent virtual buffer control.

The second delay value calculator 106 calculates a delay value $\Delta tg, 90(n)$ per GOP according to (Formula 7) based on the time information calculated by the second CPB 105. The second delay value calculator 106 outputs the calculated delay value $\Delta tg, 90(n)$ to the specific delay value determiner 107.

The specific delay value determiner 107 determines (calculates) a specific delay value based on the delay values output from the first delay value calculator 103 and the second delay value calculator 106. For example, smaller one of delay values obtained by the first delay value calculator 103 and the second delay value calculator 106 is determined as the specific delay value. The specific delay value determiner 107 may calculate a value smaller than the first delay value output from the first delay value calculator 103 and the second delay value output from the second delay value calculator 106 to determine it as the specific delay value. The specific delay value determiner 107 outputs the determined specific delay value to the multiplexer 108. Further, the specific delay value determiner 107 outputs the determined specific delay value to the first CPB 102 and the second CPB 105.

The multiplexer 108 combines the basic stream and the extended stream to generate a three dimensional stream. At this time, the multiplexer 108 writes the specific delay value output by the specific delay value determiner 107 into the three dimensional stream. That is to say, the multiplexer 108 writes the specific delay value determined by the specific delay value determiner 107 as the delay value of the basic stream. The multiplexer 108 writes the specific delay value determined by the specific delay value determiner 107 as the delay value of the three dimensional stream. As a result, the delay value of the basic stream and the delay value of the three dimensional stream can be made to be equal to each other. In H.264/AVC, the delay value of the basic stream is written into "Buffering period SEI". The delay value of the three dimensional stream is written into "Buffering period SEI" in "scalable nesting SEI". The above "Buffering period SEI", "scalable nesting SEI" and "Buffering period SEI" are syntax information defined by the H.264/AVC standard.

3. Operation

Figure 2:
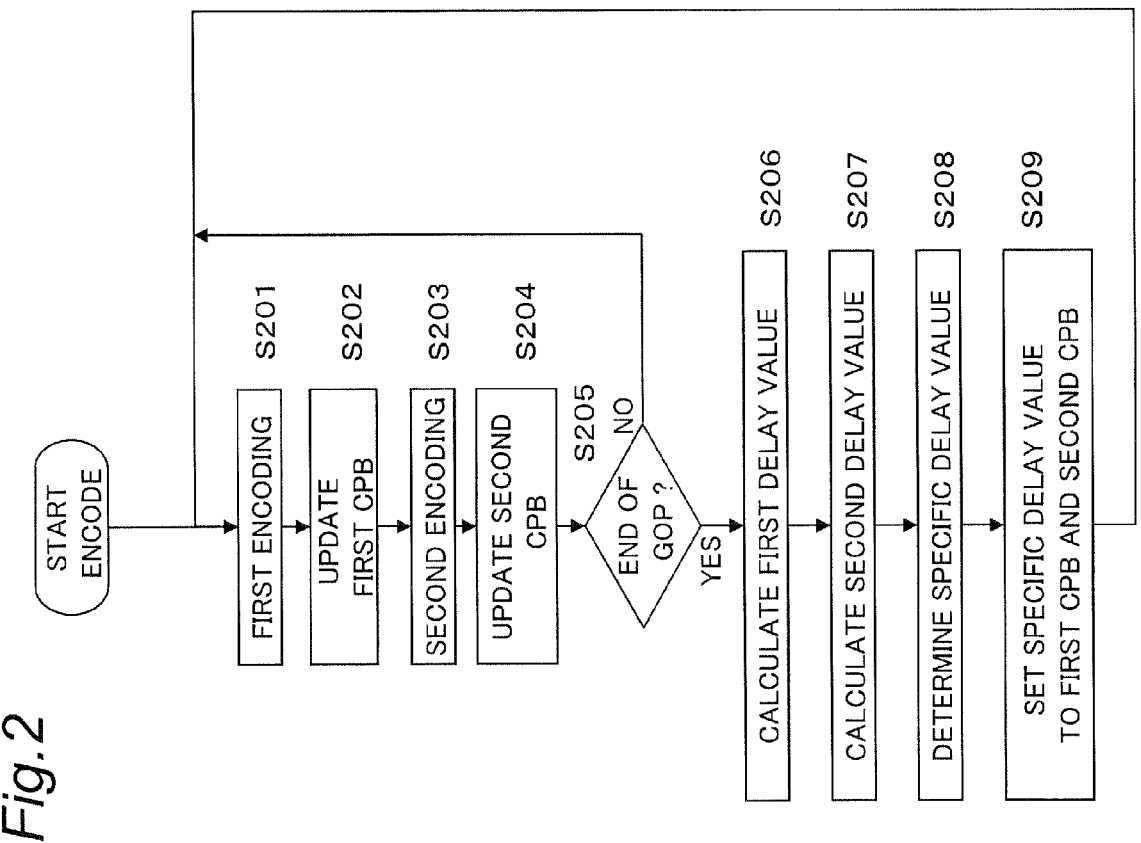
FIG. 2 is a flowchart illustrating one example of an operation of the 3D encoding apparatus according to the first embodiment.

One example of an operation of the 3D encoding apparatus according to the first embodiment will be described below with reference to a flowchart of FIG. 2.

(Step S201) When an input image is input, the first encoder 101 encodes the input image to generate a basic stream. The first encoder 101 outputs the generated basic stream to the multiplexer 108. The first encoder 101 outputs a code amount and an encoding parameter of the generated basic stream to the first CPB 102 and the second CPB 105.

(Step S202) The first CPB 102 performs the virtual buffer control based on the encoding parameter and the code amount of the basic stream generated by the first encoder 101. The first CPB 102 outputs time information generated by the process of the virtual buffer control to the first delay value calculator 103.

(Step S203) On the other hand, when the input image is input, the second encoder 104 encodes the input image to generate an extended stream. The second encoder 104 outputs the generated extended stream to the multiplexer 108. Further, the second encoder 104 outputs a code amount and an encoding parameter of the generated extended stream to the second CPB 105.

(Step S204) The second CPB 105 performs the virtual buffer control based on the code amount and the encoding parameter of the basic stream generated by the first encoder 101, and the code amount and the encoding parameter of the extended stream generated by the second encoder 104. The second CPB 105 outputs time information generated in the process of the virtual buffer control to the second delay value calculator 106.

(Step S205) The first encoder 101 and the second encoder 104 determine whether an input image to be encoded is an input image positioned at the end of GOP (hereinafter, "terminal image"). When determined as non-terminal image, the sequence goes to step S201, and the first encoder 101 and the second encoder 104 encode residual input images in GOP. When determined as a terminal image, the sequence goes to step S206.

(Step S206) The first delay value calculator 103 calculates a delay value $\Delta tg, 90(n)$ (hereinafter, suitably "a first delay value") of the basic stream based on time information output from the first CPB 102. The first delay value is not a specific delay value to be actually added to the basic stream. The specific delay value is calculated by the specific delay value determiner 107. The first delay value calculator 103 outputs the calculated first delay value to the specific delay value determiner 107.

(Step S207) The second delay value calculator 106 calculates a delay value Δtg, 90(n) (hereinafter, suitably "a second delay value") to be applied to the three dimensional stream based on the time information output from the second CPB 105. The second delay value is not a specific delay value. The specific delay value is calculated by the specific delay value determiner 107. The second delay value calculator 106 outputs the calculated second delay value to the specific delay value determiner 107.

(Step S208) The specific delay value determiner 107 determines smaller one of the first delay value and the second delay value output from the first delay value calculator 103 and the second delay value calculator 106 as the specific delay value, and outputs it to the first CPB 102 and the second CPB 105.

(Step S209) Finally, the first CPB 102 and the second CPB 105 perform the virtual buffer control relating to next GOP which follows GOP of which specific delay value is obtained based on the specific delay value output from the specific delay value determiner 107.

The above operation flow is one example, and the respective steps can be shuffled. The specific delay value generated at S208 is not limited to the above value, and thus, for example, a delay value smaller than the delay values output from the first delay value calculator 103 and the second delay value calculator 106 may be used as a specific delay value.

4. Correspondence Between the Present Disclosure and the Embodiment

"The virtual buffer control" according to the embodiment is one example of "buffer simulation" in the present disclosure. "The first encoder 101" and "the second encoder 104" according to the embodiment are one example of "an encoder" of the present disclosure. "The first CPB 102" according to the embodiment is one example of "a first virtual buffer" of the present disclosure. "The second CPB 105" according to the embodiment is one example of "a second virtual buffer" of the present disclosure. "The first delay value calculator 103" according to the embodiment is one example of "a first calculator" of the present disclosure. "The second delay value calculator 106" according to the embodiment is one example of "a second calculator" of the present disclosure. "The specific delay value determiner 107" according to the embodiment is one example of "a setter" of the present disclosure.

5. Conclusion

The 3D encoding apparatus according to the embodiment includes the first encoder 101 and the second encoder 104 that encode an input image, and generate and output a basic stream and an extended stream, the first CPB 102 that performs the buffer simulation of decoding the basic stream output from the first encoder 101, the second CPB 105 that performs the buffer simulation of decoding a three dimensional stream obtained from the basic stream output from the first encoder 101 and the extended stream output from the second encoder 104, the first delay value calculator 103 that calculates the first delay value as the delay value of the basic stream per GOP based on a result of the buffer simulation performed by the first CPB 102, the second delay value calculator 106 that calculates the second delay value as the delay value of the three dimensional stream per GOP based on a result of the buffer simulation performed by the second CPB 105, and the specific delay value determiner 107 that sets a specific delay value per GOP based on the calculated first delay value and second delay value. The specific delay value determiner 107 sets a value not more than smaller one of the delay value of the basic stream and the delay value of the three dimensional stream as the specific delay value. The first CPB 102 and the second CPB 105 perform the buffer simulation for n+1th GOP based on the specific delay value set by the specific delay value determiner 107 for nth GOP in the basic stream and the three dimensional stream.

In such a manner, the 3D encoding apparatus can set the specific delay value based on the first delay value and the second delay value. The 3D encoding apparatus feeds back the set specific delay value to a buffer simulation at the time of generating the basic stream (hereinafter, first BS) and a buffer simulation at the time of generating the three dimensional stream (hereinafter, second BS). Therefore, the 3D encoding apparatus can perform the first BS and the second BS on next GOP (n+1th GOP) based on the same delay values. Further, with a simple configuration, the first delay value and the second delay value can be set to the same value.

Since the specific delay value is a value not more than the smaller one of the first delay value and the second delay value, even when the delay values of the first BS and the second BS are replaced by the same values so that the buffer simulation is performed, the basic stream and the three dimensional stream that meet the BD standard can be always generated without interrupting the first BS and the second BS.

The first CPB 102 and the second CPB 105 output, to the first delay value calculator 103 and the second delay value calculator 106, information about time at which an input image is encoded as a result of the buffer simulation.

In such a manner, the 3D encoding apparatus can calculate the delay value based on the information about the time of the encoding. As a result, since the accurate delay value is calculated so that the buffer simulation can be performed, while a deterioration in videos is being repressed, the basic stream and the three dimensional stream that meet the BD standard can be generated.

(Second Embodiment)

1. Outline

In the first embodiment, the first delay value calculator 103 and the second delay value calculator 106 calculate the delay values based on the time information output from the first CPB 102 and the second CPB 105. Even when the first delay value output from the first delay value calculator 103 and the second delay value output from the second delay value calculator 106 are replaced by the same values, the virtual buffer control is adjusted so that the basic stream and the three dimensional stream that meet the BD standard are generated without breaking the restriction of the H.264/AVC standard. In the first embodiment, the virtual buffer control is made by using the time information in such a manner.

The virtual buffer control that is performed by the first CPB 102 and the second CPB 105 is used for ensuring non-occurrence of a buffer underflow defined by the H.264/AVC standard.

Figure 3:
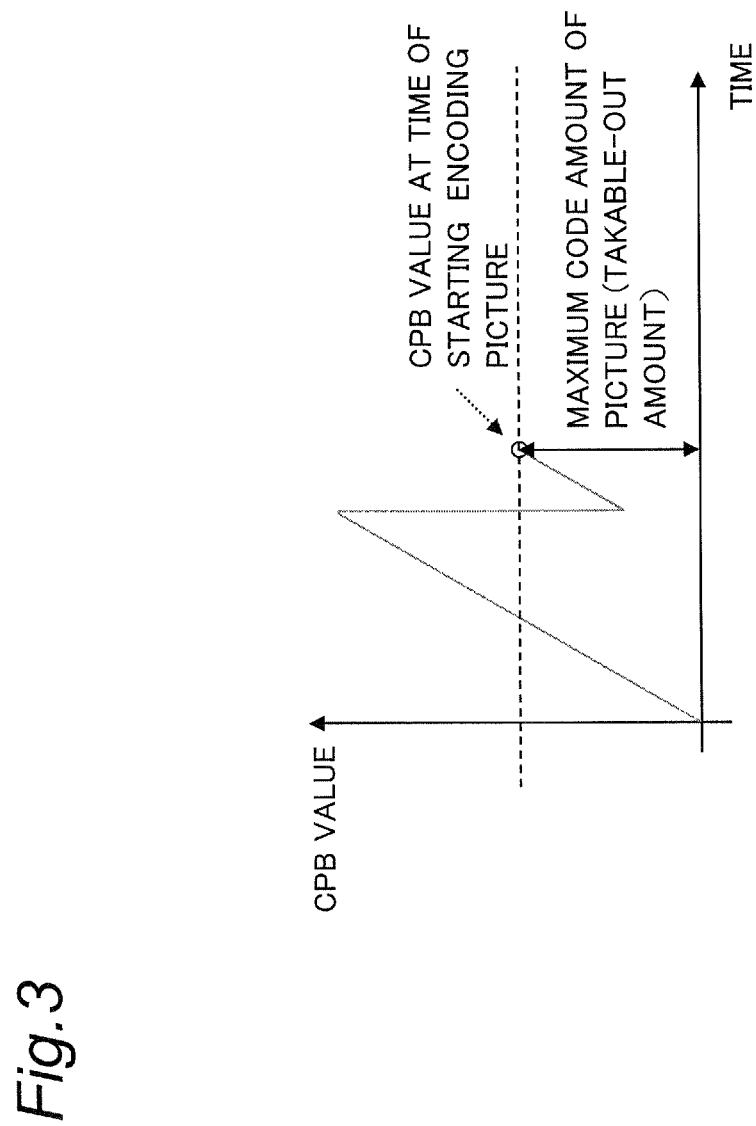
FIG. 3 is a diagram describing a condition of a buffer underflow.

FIG. 3 is a diagram describing a situation of the buffer underflow. The buffer underflow means that a buffer accumulation amount (hereinafter, "cpb value") in the virtual buffer control obtains a negative value. When a code amount exceeds the cpb value at a time of starting the encoding of an input image in the first encoder 101 and the second encoder 104, in other words, when a taking-out amount exceeds the cpb value at the time of starting to encode an input image in a virtual buffer modeled on an input buffer of the decoder (a code amount is not less than a takable-out amount at the time of starting to encode an input image), the buffer underflow occurs. For this reason, the first encoder 101 and the second encoder 104 set a code amount smaller than the cpb value at the time of starting to encode an input image as a maximum code amount of the input image. The first encoder 101 and the second encoder 104 adjust the encoding parameter so that the generated code amount does not exceed the maximum code amount at a time of actual encoding.

When the above point is taken into consideration, the use of the cpb value performs the virtual buffer control easier than use of time information. When a CABAC (context adaptive binary arithmetic coding) process is used in the H.264/AVC standard, a delay occurs until the generated code amount of each input image is determined. For this reason, the cpb value cannot be obtained at suitable timing. Also due to this, not the virtual buffer control based on the time by means of the delay values but the simple virtual buffer control based on the cpb value is necessary. For this reason, the virtual buffer control based on the cpb value is occasionally used as the virtual buffer control. The cpb value in the case should be modified in order to keep the restriction of the BD standard.

A second embodiment provides the 3D encoding apparatus that is capable of making the delay value of the basic stream and the delay value of three dimensional stream equal to each other even when the cpb value is used for the virtual buffer control.

In the second embodiment, the delay value of the basic stream and the delay value of the three dimensional stream are calculated based on encoding rates and the cpb values of the basic stream and three dimensional stream. The specific delay value is set based on the calculated two delay values.

2. Configuration

A configuration of the 3D encoding apparatus according to a second embodiment will be described below with reference to the drawings.

Figure 4:
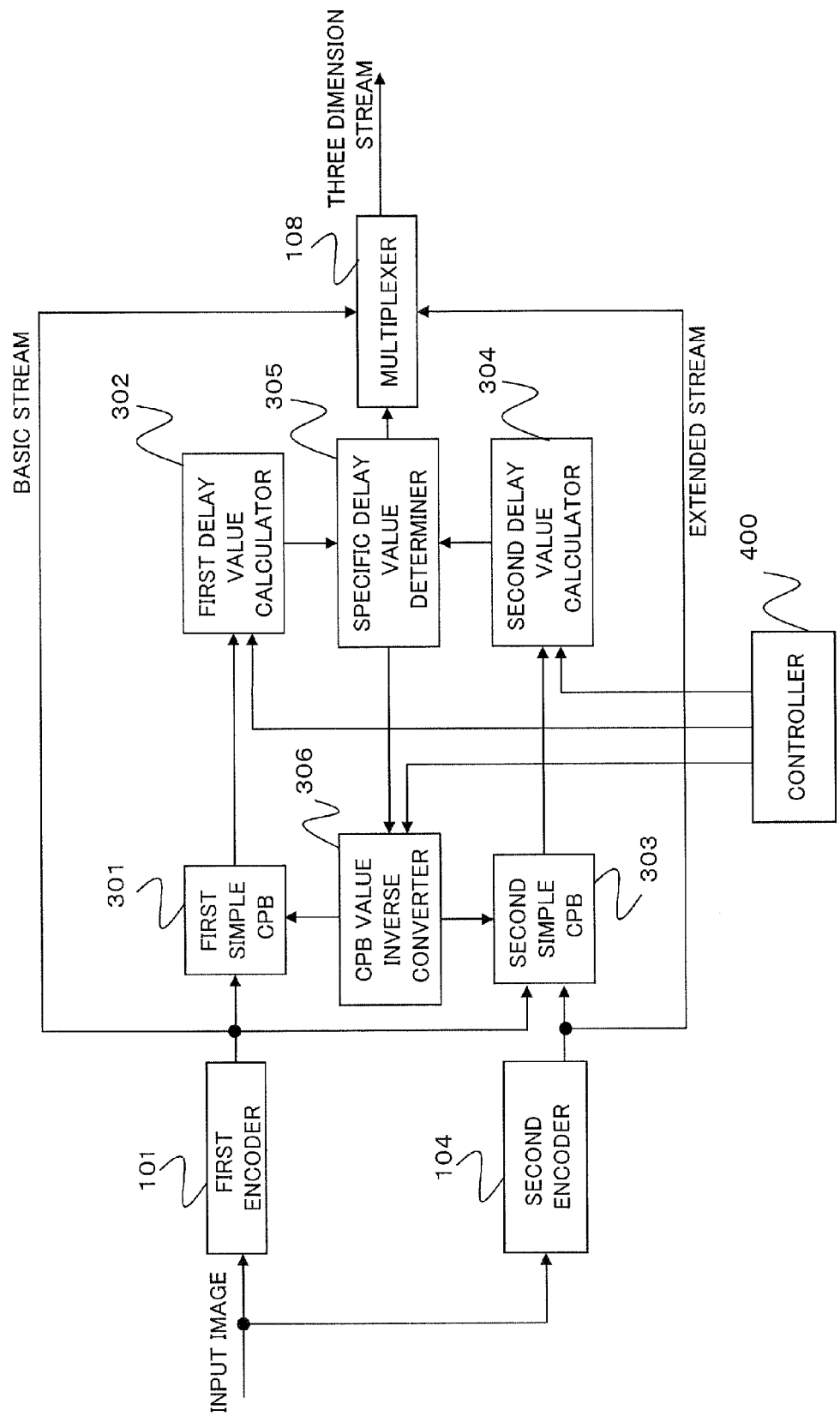
FIG. 4 is a diagram illustrating a constitution of the 3D encoding apparatus according to a second embodiment.

FIG. 4 is a diagram illustrating the configuration of the 3D encoding apparatus according to the second embodiment. The parts of the configuration similar to those in the first embodiment are denoted by the same reference symbols, and detailed description thereof is omitted.

The first simple CPB 301 is a virtual buffer for performing the virtual buffer control using the cpb value based on the encoding parameter and the code amount output from the first encoder 101. The encoding parameter represents information about the encoding including syntax information. The code amount is a code amount obtained by actually encoding an input image in the first encoder 101 or a code amount as a predicted value in the first encoder 101. The first simple CPB 301 calculates the cpb value (hereinafter, "cpb1") in the basic stream. The first simple CPB 301 calculates cpb1(n) in nth input image according to the following formula.

$$\text{cpb1}(n) = \text{cpb1}(n-1) + (BR1*T) - b1(n) \quad \text{(Formula 8)}$$

BR1 represents a maximum bit rate of the basic stream, and is, for example, 12 Mbps. T is an inverse number of a picture rate. In other words, T is a value representing time from (n−1st) input image included in the basic stream to nth input image. Further, b1(n) represents a code amount of the nth input image in the basic stream. The maximum bit rate and the picture rate of the basic stream are given from a controller 400 that controls the 3D encoding apparatus entirely. The maximum bit rate of the basic stream may be a value that changes in each GOP. The configuration may be such that the fixed maximum bit rate is given to input images.

The first simple CPB 301 outputs cpb1(n) to a first delay value calculator 302. The first simple CPB 301 outputs cpb1(n) to the first delay value calculator 302 at, for example, the end of GOP.

The first simple CPB 301 uses the cpb value output from a CPB value inverse converter 306 for the virtual buffer control over GOP (n+1th GOP) next to GOP (nth GOP) of which first delay value and second delay value are obtained. That is to say, in the virtual buffer control over GOP next to GOP that is currently processed, the cpb value output by the CPB value inverse converter 306 is used instead of the current cpb value. Even when the current cpb value is replaced, the delay value of the basic stream and delay value of the three dimensional stream can be made to be equal to each other by the above operation of the first simple CPB 301 without interrupting the virtual buffer control.

The first delay value calculator 302 calculates the delay value of the basic stream based on cpb1 output from the first simple CPB 301 and the maximum bit rate of the basic stream given from the controller 400 that controls the 3D encoding apparatus entirely.

Figure 5:
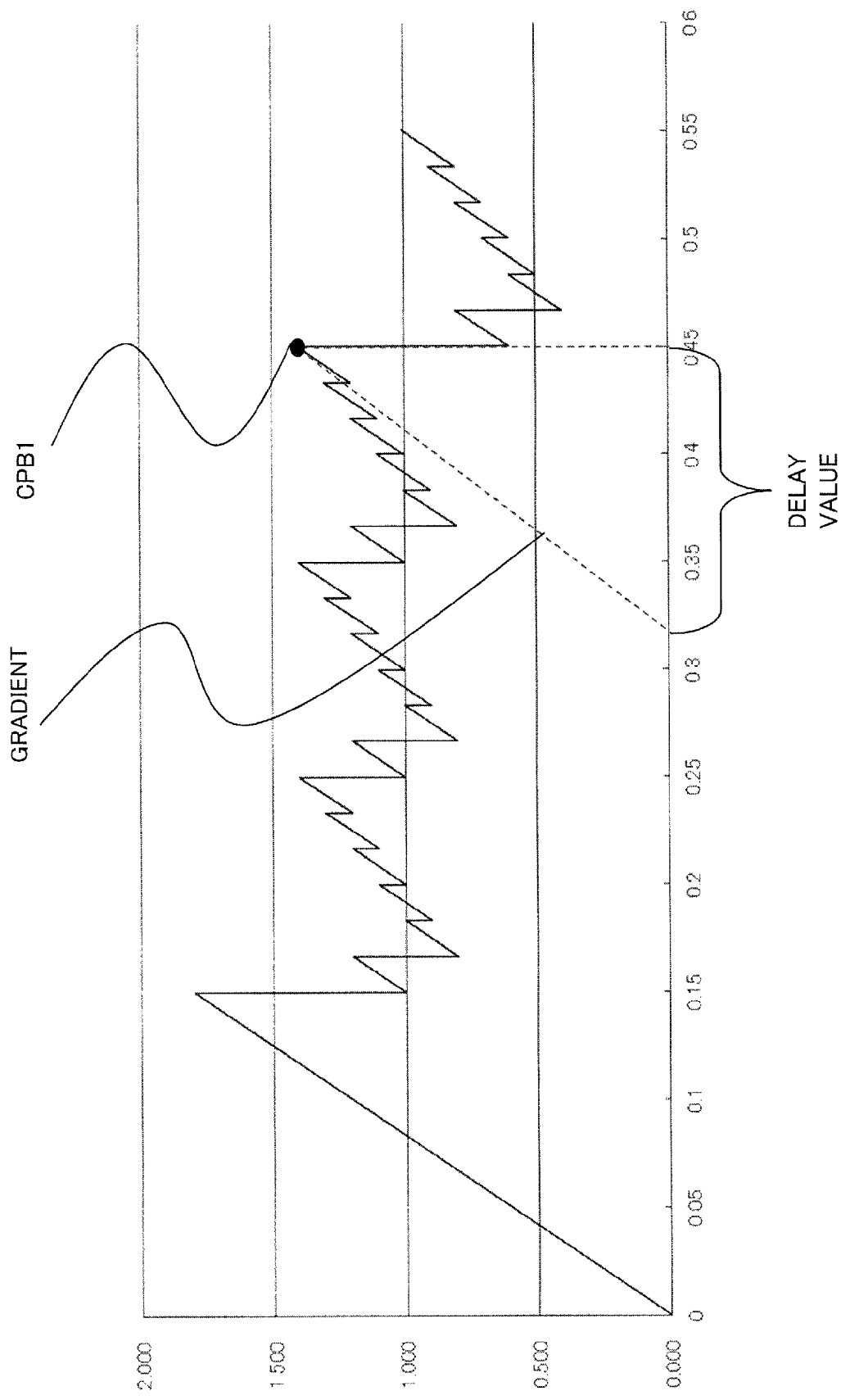
FIG. 5 is a diagram illustrating virtual buffer control in a first simple CPB 301 according to the second embodiment.

FIG. 5 is a diagram illustrating the virtual buffer control in the first simple CPB 301.

In the graph of FIG. 5, a gradient shown by a broken line represents the maximum bit rate. In this case, a relationship between the cpb value and the delay value is as shown in FIG. 5. For example, 1500 bits is given as the cpb value, and 12 Mbps is given as the maximum bit rate. In this case, the first delay value calculator 302 calculates the delay value to obtain 0.125 ms according to the following formula.

$$\text{(delay value)} = \text{(the cpb value)}/\text{(the maximum bit rate)} \quad \text{(Formula 10)}$$

The first delay value calculator 302 outputs the calculated delay value to the specific delay value determiner 305.

The second simple CPB 303 is a virtual buffer for performing the virtual buffer control using the cpb value based on the encoding parameter and the code amount output from the first encoder 101 and the second encoder 104. The encoding parameter represents information relating to the encoding including syntax information. The code amount is a code amount obtained by actually encoding an input image through the first encoder 101 and the second encoder 104 or a code amount as a predicted value. The second simple CPB 303 calculates the cpb value (hereinafter, cpb2) in the three dimensional stream. The second simple CPB 303 calculates cpb2(n) of nth input image according to the following formula.

$$\text{cpb2}(n) = \text{cpb2}(n-1) + (BR2*T) - b2(n) \quad \text{(Formula 11)}$$

BR2 represents a maximum bit rate of the three dimensional stream, and is, for example, 24 Mbps. T represents an inverse number of the picture rate. In short, T is a value representing the time from the (n−1st) input image to the nth input image included in the three dimensional stream. Further, b2(n) represents a code amount of the nth input image of the three dimensional stream. That is to say, b2(n) is a sum of the code amount of the nth input image in the basic stream output from the first encoder 101, and the code amount of the nth input image in the extended stream output from the second encoder 104. The maximum bit rate and the picture rate in three dimensional stream is given from the controller 400 that controls the 3D encoding apparatus entirely. The maximum bit rate of the three dimensional stream may be a value that changes in each GOP. The fixed maximum bit rate may be given to the input image.

The second simple CPB 303 outputs cpb2(n) to the second delay value calculator 304. The second simple CPB 303 outputs cpb2 to the second delay value calculator 304 at, for example, the end of GOP.

The second simple CPB 303 uses the cpb value output from the CPB value inverse converter 306 for the virtual buffer control over next GOP. That is to say, in the virtual buffer control over GOP (n+1th GOP) next to GOP (nth GOP) of which first delay value and second delay value used for the calculation of the specific delay value are obtained, the cpb value output from the CPB value inverse converter 306 is used instead of the current cpb value. Even when the current cpb value is replaced, the delay value of the basic stream and the delay value of the three dimensional stream can be made to be equal to each other by the above operation of the second simple CPB 303 without interrupting the virtual buffer control.

The second delay value calculator 304 calculates the delay value of the three dimensional stream based on cpb2 output from the second simple CPB 303 and the maximum bit rate of the three dimensional stream given from the controller 400 that controls the 3D encoding apparatus entirely.

The second delay value calculator 304 calculates the delay value of the three dimensional stream based on the relationship in (Formula 10). For example, 3200 bits is given as cpb2, and 24 Mbps is given as the maximum bit rate. In this case, the second delay value calculator 304 calculates the delay value to obtain 0.133 ms according to the following formula.

The second delay value calculator 304 outputs the calculated delay value to the specific delay value determiner 305.

The specific delay value determiner 305 dete mines (calculates) the specific delay value based on the delay values output from the first delay value calculator 302 and the second delay value calculator 304. For example, smaller one of the delay value obtained by the first delay value calculator 302 and the delay value obtained by the second delay value calculator 304 is determined to be output as the delay value. The specific delay value determiner 305 may calculate to output a value smaller than the obtained delay value. The specific delay value determiner 305 outputs the determined (calculated) delay value to the CPB value inverse converter 306. Further, the specific delay value determiner 305 outputs the determined (calculated) specific delay value to the multiplexer 108.

The CPB value inverse converter 306 calculates the cpb value employed in the first simple CPB 301 and the cpb value employed in the second delay value calculator 304 based on the specific delay value output from the specific delay value determiner 305, the maximum bit rate of the basic stream and the maximum bit rate of the three dimensional stream given by the controller 400 for controlling the 3D encoding apparatus entirely. The CPB value inverse converter 306 outputs the calculated cpb values to the first simple CPB 301 and the second simple CPB 303.

For example, the CPB value inverse converter 306 obtains 0.125 ms as the specific delay value from the specific delay value determiner 305. The maximum bit rate of the basic stream is determined as 12 Mbps, and the maximum bit rate of the three dimensional stream is determined as 24 Mbps. At this time, the CPB value inverse converter 306 calculates the cpb values to be employed in the first simple CPB 301 and the second simple CPB 303 according to the following formula.

(the cpb value)=(delay value)*(the maximum bit rate)  (Formula 12)

That is to say, the CPB value inverse converter 306 calculates the cpb values to be employed in the first simple CPB 301 to obtain 1500 bits. The CPB value inverse converter 306 calculates the cpb value to be employed in the second simple CPB 303 to obtain 3000 bits. In this case, since the specific delay value output from the specific delay value determiner 305 is the delay value calculated by the first delay value calculator 302, the cpb value output from the CPB value inverse converter 306 to the first simple CPB 301 is not different from the cpb value originally output from the first simple CPB 301. However, the cpb value output from the CPB value inverse converter 306 to the second simple CPB 303 is calculated based on the delay value calculated by the first delay value calculator 302.

3. Operation 3-1. Operation of the Second Simple CPB 303

Before description of an entire operation, an operation of the second simple CPB 303 will be described with reference to the drawings.

Figure 6:
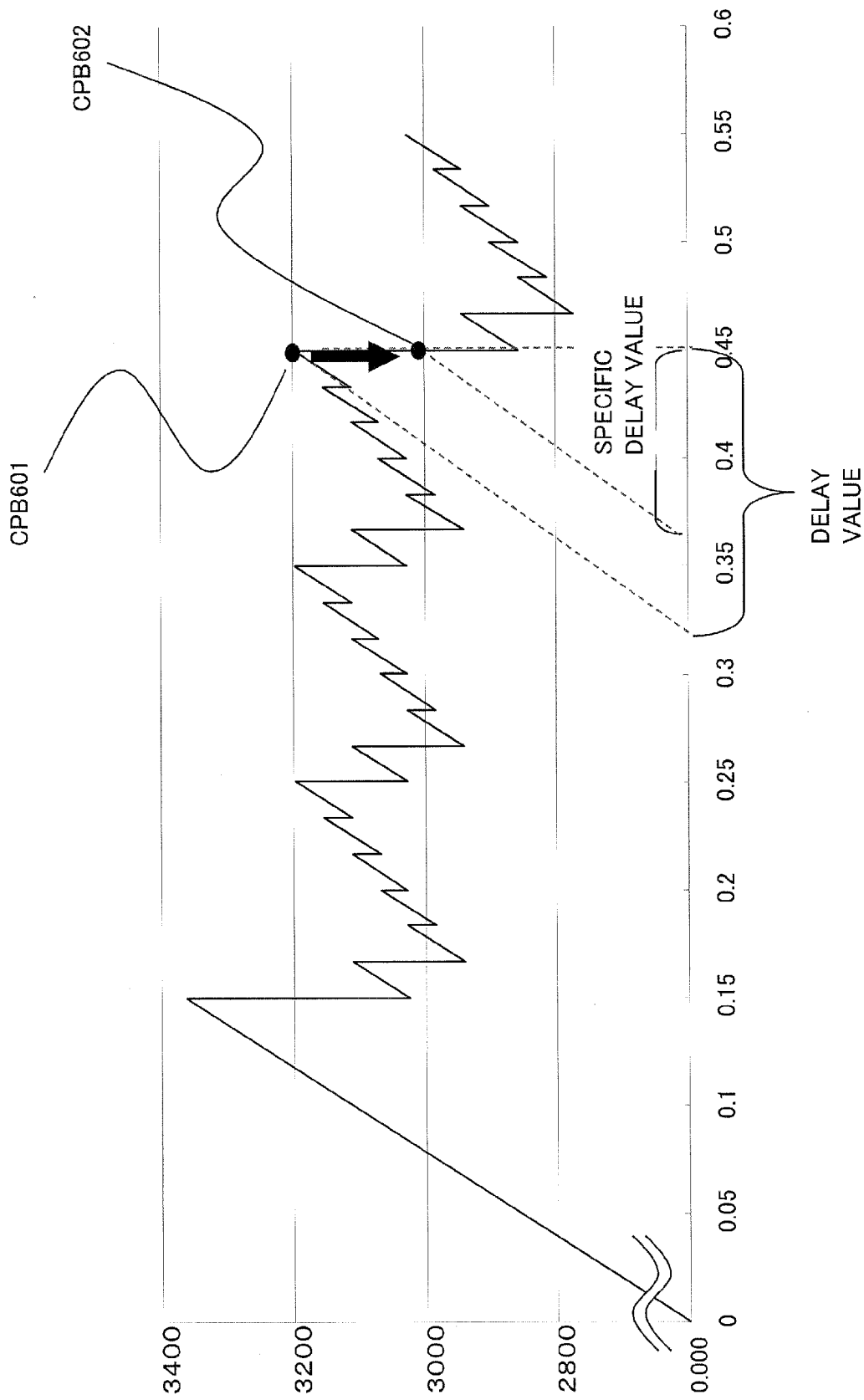
FIG. 6 is a diagram describing an operation of the virtual buffer control over a second simple CPB 303 according to the second embodiment.

FIG. 6 is a diagram describing an operation of the virtual buffer control in the second simple CPB 303.

A cpb 601 shown in FIG. 6 represents the cpb value at the end of GOP. The second simple CPB 303 outputs the cpb value to the second delay value calculator 304. When the second simple CPB 303 outputs the cpb value to the second delay value calculator 304, a modified cpb value is input into the second simple CPB 303 via the second delay value calculator 304, the specific delay value determiner 305 and the CPB value inverse converter 306. The modified cpb value is, for example, cpb 602 shown in FIG. 6. The second simple CPB 303 uses the cpb 602 in the virtual buffer control over GOP (n+1th GOP) next to GOP (nth GOP) of which specific delay value is determined. In short, the cpb value of the second simple CPB 303 is modified according to the change in the delay value of the specific delay value determiner 305.

In such a manner, the delay values of the basic stream and the three dimensional stream can be easily set to the same value. Even when the delay value obtained from the virtual buffer control is changed, input images can be encoded without interrupting the subsequent virtual buffer control. An influence of the change in the delay values necessary on the basis of the BD standard can be reflected on the cpb value to be used for avoiding the buffer underflow. As a result, while the buffer underflow is being repressed, and the encoding operation that meets the BD standard can be realized.

3-2. Operation of the 3D Encoding Apparatus

Figure 7:
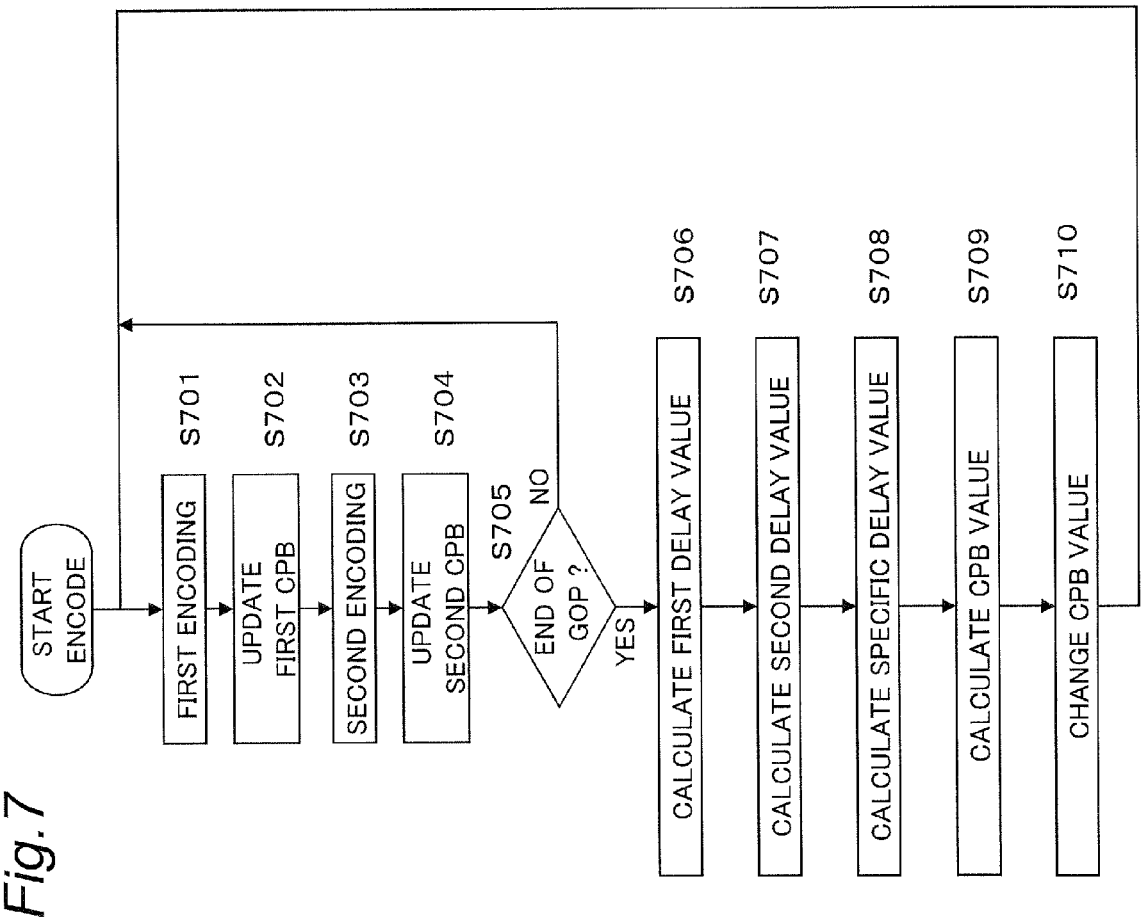
FIG. 7 is a flowchart illustrating one example of an operation of a 3D moving image encoding method according to the second embodiment.

One example of an operation of a 3D moving image encoding method according to the second embodiment will be described below with reference to a flowchart of FIG. 7.

(Step S701) When an input image is input, the first encoder 101 encodes the input image to generate a basic stream. The first encoder 101 outputs the generated basic stream to the multiplexer 108. The first encoder 101 outputs a code amount and an encoding parameter of the generated basic stream to the first simple CPB 301 and the second simple CPB 303.

(Step S702) The first simple CPB 301 performs the virtual buffer control using the cpb value based on the encoding parameter and the code amount of the basic stream generated by the first encoder 101.

(Step S703) On the other hand, when an input image is input, the second encoder 104 encodes the input image to generate an extended stream. The second encoder 104 outputs the generated extended stream to the multiplexer 108. The second encoder 104 outputs a code amount and an encoding parameter of the generated extended stream to the second simple CPB 303.

(Step S704) The second simple CPB 303 performs the virtual buffer control using the cpb value based on the code amount and the encoding parameter of the basic stream generated by the first encoder 101 and the code amount and the encoding parameter of the extended stream generated by the second encoder 104.

(Step S705) The first encoder 101 and the second encoder 104 determine whether the input image to be encoded is an input image (hereinafter, "a terminal image") positioned at the end of GOP. When the determination is made as not being a terminal image, the sequence goes to S701, and the first encoder 101 and the second encoder 104 encodes residual input images in GOP. When the determination is made as being a terminal image, the first simple CPB 301 outputs the cpb value at the time of the end of GOP to the first delay value calculator 302. The second simple CPB 303 outputs the cpb value at the time of the end of GOP to the second delay value calculator 304. The sequence, then, goes to S706.

(Step S706) The first delay value calculator 302 calculates a delay value (hereinafter, "the first delay value") of the basic stream based on the cpb value output from the first simple CPB 301. The first delay value is not the specific delay value to be actually added to the basic stream. The specific delay value to be actually added is calculated by the specific delay value determiner 305. The first delay value calculator 302 outputs the calculated first delay value to the specific delay value determiner 305.

(Step S707) The second delay value calculator 304 calculates a delay value (hereinafter, "second delay value") to be applied to the three dimensional stream based on the cpb value output from the second simple CPB 303. The second delay value is not the specific delay value. The specific delay value to be actually added is calculated by the specific delay value determiner 305. The second delay value calculator 304 outputs the calculated second delay value to the specific delay value determiner 305.

(Step S708) The specific delay value determiner 305 determines a smaller one of the first delay value and the second delay value output from the first delay value calculator 302 and the second delay value calculator 304 as the specific delay value, and outputs it to the CPB value inverse converter 306.

(Step S709) The CPB value inverse converter 306 calculates the cpb values to be used by the first simple CPB 301 and the second simple CPB 303 based on the specific delay value output from the specific delay value determiner 305. The CPB value inverse converter 306 outputs the calculated cpb values to the first simple CPB 301 and the second simple CPB 303.

(Step S710) Finally, the first simple CPB 301 and the second simple CPB 303 perform the virtual buffer control over GOP (n+1th GOP) next to GOP (nth GOP) of which specific delay value is obtained based on the cpb value output from the CPB value inverse converter 306.

The above operation flow is one example, and the respective steps can be shuffled. The specific delay values generated at S708 are not limited to the above values and for example, a delay value that is smaller than the first delay value and the second delay value output from the first delay value calculator 302 and the second delay value calculator 304 may be used as the specific delay value.

4. Conclusion

The 3D encoding apparatus according to the embodiment includes the first encoder 101 and the second encoder 104 that encode an input image to generate a basic stream and an extended stream, the first simple CPB 301 that performs the buffer simulation of decoding the basic stream output from the first encoder 101, the second simple CPB 303 that performs the buffer simulation of decoding a three dimensional stream based on the basic stream output from the first encoder 101 and the extended stream output from the second encoder 104, the first delay value calculator 302 that calculates the first delay value as a delay value of the basic stream for each GOP based on a result of the buffer simulation performed by the first simple CPB 301, the second delay value calculator 304 that calculates the second delay value as a delay value of the three dimensional stream for each GOP based on a result of the buffer simulation performed by the second simple CPB 303, and the specific delay value determiner 305 that sets the specific delay value for each GOP based on the calculated first delay value and second delay value. The specific delay value determiner 305 sets a value that is not more than smaller one of the delay value of the basic stream and the delay value of the three dimensional stream as the specific delay value. The first simple CPB 301 and the second simple CPB 303 perform the buffer simulation of n+1th GOP based on the specific delay value of nth GOP in the basic stream and three dimensional stream set by the specific delay value determiner 305. When the specific delay value output from the specific delay value determiner 305 is input, the first simple CPB 301 modifies the buffer accumulation amount of the first simple CPB 301 at the input time based on the specific delay value, and performs the buffer simulation of GOP (n+1th GOP) next to GOP (nth GOP) of which specific delay value is obtained. When the specific delay value output from the specific delay value determiner 305 is input, the second simple CPB 303 modifies a buffer accumulation amount of the second simple CPB 303 at the input time based on the specific delay value, and performs the buffer simulation of GOP (n+1th GOP) next to GOP (nth GOP) of which specific delay value is obtained.

In such a manner, even when the 3D encoding apparatus performs the buffer simulation using the buffer accumulation amount, the delay value to be added to the basic stream and the delay value to be added to the three dimensional stream can be made to be equal to each other by the simple configuration. As a result, even when the buffer simulation is performed in the simple configuration, the basic stream and the three dimensional stream that meet the BD standard can be generated.

Since the specific delay value is not more than smaller one of the first delay value and the second delay value, even when the delay values of the first BS and the second BS are replaced by the same delay value so that the buffer simulation is performed, the basic stream and the three dimensional stream that meet the BD standard can be always generated without interrupting the first BS and the second BS.

When the specific delay value output from the specific delay value determiner 305 is input to the first simple CPB 301, the first simple CPB 301 modifies the buffer accumulation amount of the first simple CPB 301 at the input time based on the specific delay value, and performs the buffer simulation of GOP (n+1th GOP) next to GOP (nth GOP) of which specific delay value is obtained. When the specific delay value output from the specific delay value determiner 305 is input, the second simple CPB 303 modifies the buffer accumulation amount of the second simple CPB 303 at the input time based on the specific delay value, and performs the buffer simulation of GOP (n+1th GOP) next to GOP (nth GOP) of which specific delay value is obtained.

In such a manner, the buffer accumulation amounts in the first simple CPB 301 and the second simple CPB 303 can be modified according to the setting of the specific delay value. As a result, even when the first delay value and the second delay value are changed into the specific delay value, the 3D encoding apparatus can generate the basic stream and the three dimensional stream that meet the BD standard without interrupting the buffer simulation using the buffer accumulation amount.

(Third Embodiment)

1. Outline

The first embodiment describes the configuration where the specific delay value is calculated so that the delay value of the basic stream and the delay value of the three dimensional stream calculated based on the time information are equal to each other.

In the third embodiment, the specific delay value is calculated so that the delay value of the basic stream, the delay value of the extended stream and the delay value of the three dimensional stream calculated based on the time information are equal to each other.

2. Configuration

The configuration of the 3D encoding apparatus according to a third embodiment will be described below with reference to the drawings.

Figure 8:
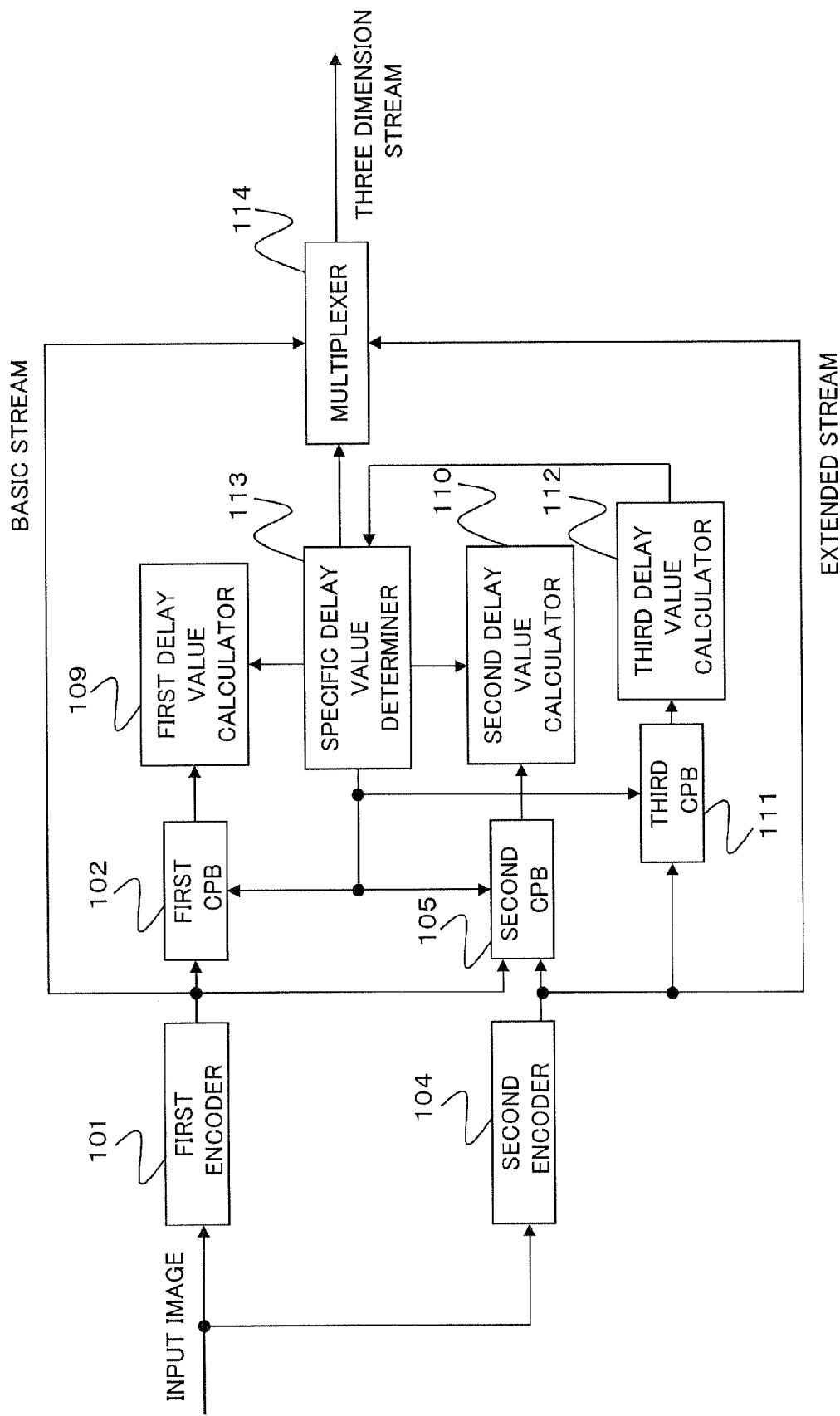
FIG. 8 is a diagram illustrating a configuration of the 3D encoding apparatus according to a third embodiment.

FIG. 8 is a diagram illustrating the configuration of the 3D encoding apparatus according to the third embodiment. Parts that are the same as those in the first embodiment are denoted by the same reference symbols, and detailed description thereof is omitted.

The first delay value calculator 109 basically performs the similar operation to that of the first delay value calculator 103 in the first embodiment. However, the first delay value calculator 109 is different from the first delay value calculator 103 in that the calculated delay value is output to the specific delay value determiner 113.

The second delay value calculator 110 basically performs the similar operation to that of the second delay value calculator 106 in the first embodiment. The second delay value calculator 110 is different from the second delay value calculator 106 in that the calculated delay value is output to the specific delay value determiner 113.

A third CPB 111 is a virtual buffer for performing the virtual buffer control based on the encoding parameter and the code amount output from the second encoder 104. The third CPB 111 calculates time information tai(n), taf(n), tr,n (n) relating to the extended stream based on the formulas 1 to 6. The time information tai(n), taf(n), tr,n(n), and the formulas 1 to 6 are defined by the H.264/AVC standard as described in the first embodiment. The third CPB 111 assigns the encoding parameter relating to the extended stream output from the second encoder 104 to the formulas 1 to 6. Here, b(n) is the generated code amount of the nth input image in extended stream.

The third CPB 111 performs the virtual buffer control using the specific delay value input from the specific delay value determiner 113. The third CPB 111 assigns the specific delay value received from the specific delay value determiner 113 to initial_cpb_removal_delay in (Formula 4). The third CPB 111 calculates tai,earliest(n) and performs the subsequent virtual buffer control.

A third delay value calculator 112 calculates the delay value Δtg, 90(n) for each GOP based on the time information calculated by the third CPB 111 according to (Formula 7). The third delay value calculator 112 outputs the calculated delay value to the specific delay value determiner 113.

The specific delay value determiner 113 calculates a specific delay value based on the delay values output from the first delay value calculator 109, the second delay value calculator 110 and the third delay value calculator 112. For example, smallest one of the delay value obtained by the first delay value calculator 109, the delay value obtained by the second delay value calculator 110, and the delay value obtained by the third delay value calculator 112 is output as the specific delay value. The specific delay value determiner 113 may output a value smaller than the obtained delay value. The specific delay value determiner 113 outputs the calculated specific delay value to the multiplexer 114. Further, the specific delay value determiner 113 outputs the calculated specific delay value to the first CPB 102, the second CPB 105 and the third CPB 111.

The multiplexer 114 basically performs the same operation as that of the multiplexer 108 in the first embodiment. The multiplexer 114 is different from the multiplexer 108 in the first embodiment in that the specific delay value calculated by the specific delay value determiner 113 is written as the delay value of the extended stream. The multiplexer 114 performs the above operation, to be capable of making the delay value of the basic stream, the delay value of the extended stream and the delay value of the three dimensional stream equal to each other. In the H.264/AVC standard, the delay value of the extended stream is written into a suitable part of syntax defined by the H.264/AVC such as "Buffering period SEI". That is to say, such a part may be any part as long as the delay value of the extended stream can be read therefrom in a reproducing side.

3. Operation

Figure 9:
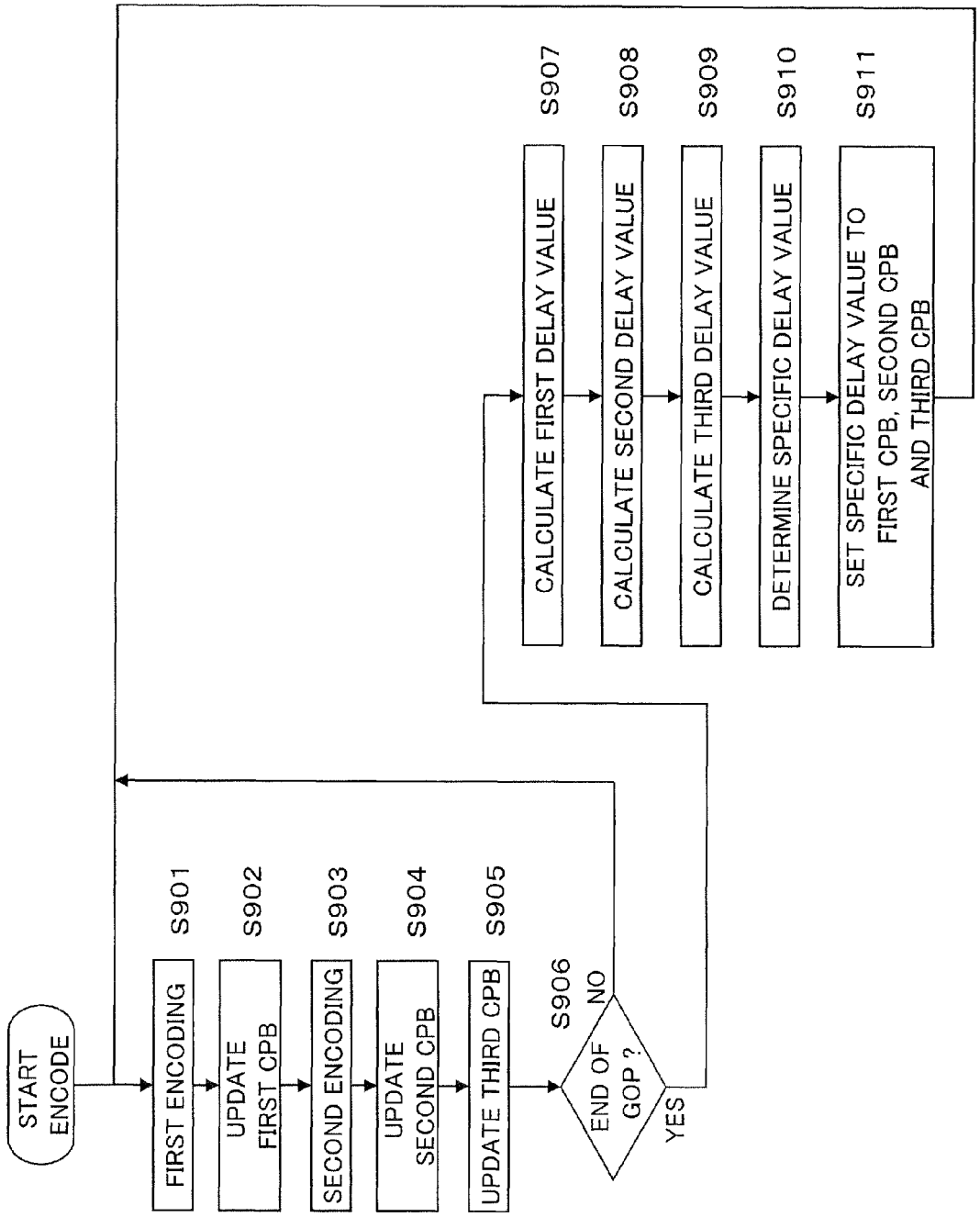
FIG. 9 is a flowchart illustrating one example of an operation of the 3D encoding apparatus according to the third embodiment.

One example of the operation of the 3D encoding apparatus according to the third embodiment will be described below with reference to a flowchart of FIG. 9.

(Step S901) When an input image is input, the first encoder 101 encodes the input image to generate a basic stream. The first encoder 101 outputs the generated basic stream to the multiplexer 114. Further, the first encoder 101 outputs a code amount and an encoding parameter of the generated basic stream to the first CPB 102 and the second CPB 105.

(Step S902) The first CPB 102 performs the virtual buffer control based on the encoding parameter and the code amount of the basic stream generated by the first encoder 101. The first CPB 102 outputs time information generated in the process of the virtual buffer control to the first delay value calculator 109.

(Step S903) On the other hand, when an input image is input, the second encoder 104 encodes the input image to generate an extended stream. The second encoder 104 outputs the generated extended stream to the multiplexer 114. The second encoder 104 outputs a code amount and an encoding parameter of the generated extended stream to the second CPB 105 and the third CPB 111.

(Step S904) The second CPB 105 performs the virtual buffer control based on the code amount and the encoding parameter of the basic stream generated by the first encoder 101, and the code amount and the encoding parameter of the extended stream generated by the second encoder 104. The second CPB 105 outputs time information generated in the process of the virtual buffer control to the second delay value calculator 110.

(Step S905) The third CPB 111 performs the virtual buffer control based on the code amount and the encoding parameter of the extended stream generated by the second encoder 104. The third CPB 111 outputs time information generated in the process of the virtual buffer control to the third delay value calculator 112.

(Step S906) The first encoder 101 and the second encoder 104 determine whether an input image to be encoded is an input image (hereinafter, "terminal image") positioned at the end of GOP. When the determination is made as not being a terminal image, the sequence goes to S901, and the first encoder 101 and the second encoder 104 encodes residual input images in GOP. When the determination is made as being a terminal image, the sequence goes to S907.

(Step S907) The first delay value calculator 109 calculates a delay value (hereinafter, "the first delay value") of the basic stream based on the time information output from the first CPB 102. The first delay value is not a specific delay value to be actually added to the basic stream. The specific delay value is calculated by the specific delay value determiner 113. The first delay value calculator 109 outputs the calculated first delay value to the specific delay value determiner 113.

(Step S908) The second delay value calculator 110 calculates a delay value (hereinafter, "the second delay value") to be applied to the three dimensional stream based on the time information output from the second CPB 105. The second delay value is not a specific delay value. The specific delay value is calculated by the specific delay value determiner 113. The second delay value calculator 110 outputs the calculated second delay value to the specific delay value determiner 113.

(Step S909) The third delay value calculator 112 calculates a delay value (hereinafter, "a third delay value") to be applied to the extended stream based on the time information output from the third CPB 111. The third delay value is not a specific delay value. The specific delay value is calculated by the specific delay value determiner 113. The third delay value calculator 112 outputs the calculated third delay value to the specific delay value determiner 113.

(Step S910) The specific delay value determiner 113 determines the smallest delay value of the first delay value, the second delay value and the third delay value output from the first delay value calculator 109, the second delay value calculator 110 and the third delay value calculator 112 as a specific delay value, and outputs it to the first CPB 102, the second CPB 105 and the third CPB 111.

(Step S911) Finally, the first CPB 102, the second CPB 105 and the third CPB 111 perform the virtual buffer control over GOP (n+1th GOP) next to GOP (nth GOP) of which specific delay value is obtained based on the specific delay value output from the specific delay value determiner 113.

The above operation flow is one example, and the respective steps can be shuffled. The specific delay value generated by the specific delay value determiner 113 is not limited to the above value, and for example, a delay value that is smaller than the smallest delay value of the delay values output from the first delay value calculator 109, the second delay value calculator 110 and the third delay value calculator 112 may be used as the specific delay value.

4. Conclusion

The 3D encoding apparatus according to the third embodiment includes the first encoder 101 and the second encoder 104 that encode input images to generate a basic stream and an extended stream, the first CPB 102 that performs the buffer simulation of decoding the basic stream output from the first encoder 101, the second CPB 105 that performs the buffer simulation of decoding a three dimensional stream obtained from the basic stream output from the first encoder 101 and the extended stream output from the second encoder 104, the third CPB 111 that performs the buffer simulation of decoding the extended stream, the first delay value calculator 109 that calculates the first delay value as a delay value of the basic stream for each GOP based on a result of the buffer simulation performed by the first CPB 102, the second delay value calculator 110 that calculates the second delay value as a delay value of the three dimensional stream for each GOP based on a result of the buffer simulation performed by the second CPB 105, the third delay value calculator 112 that calculates the third delay value as a delay value of the extended stream for each GOP based on a result of the buffer simulation performed by the third CPB 111, and the specific delay value determiner 113 that sets the specific delay value based on the first delay value, the second delay value and the third delay value. The specific delay value determiner 113 determines a value that is not more than the smallest delay value of the first delay value, the second delay value and the third delay value. The first CPB 102, the second CPB 105 and the third CPB 111 perform the buffer simulation of n+1th GOP based on the specific delay value of the nth GOP in the basic stream, the three dimensional stream and extended stream set by the specific delay value determiner 113.

The 3D encoding apparatus according to the third embodiment can set the specific delay value based on the first delay value, the second delay value and the third delay value. The 3D encoding apparatus can feed back the set specific delay value to the first BS, the second BS and the buffer simulation (hereinafter, third BS) at a time of generating the extended stream. Therefore, the 3D encoding apparatus can perform the first BS, the second BS and the third BS in next GOP based on the same delay values. With the simple configuration, the first delay value, the second delay value and the third delay value can be set to the same value.

Since the specific delay value is not more than the smallest one of the first delay value, the second delay value and the third delay value, even when the delay values of the first BS, the second BS and the third BS are replaced by the same delay value so that the buffer simulation is performed, the basic stream, the three dimensional stream and the extended stream that meet the BD standard can be always generated without interrupting the first BS, the second BS and the third BS.

For, example, the first CPB 102, the second CPB 105 and the third CPB 111 output the information about the time of encoding input images as the result of the buffer simulation to the first delay value calculator 109, the second delay value calculator 110 and the third delay value calculator 112.

In such a manner, the 3D encoding apparatus can calculate the delay value based on the information relating to the encoding time. As a result, since the accurate delay value can be calculated and the buffer simulation can be performed, while a deterioration in videos is being repressed, the basic stream, the three dimensional stream and the extended stream that meet the BD standard can be generated.

(Fourth Embodiment)

1. Outline

The second embodiment describes the configuration that the specific delay value is calculated so that the delay value of the basic stream and the delay value of the three dimensional stream calculated based on the cpb value are equal to each other.

In the fourth embodiment, the specific delay value is calculated so that the delay value of the basic stream, the delay value of the extended stream and the delay value of the three dimensional stream calculated based on the cpb value are equal to each other.

2. Configuration

The 3D encoding apparatus according to a fourth embodiment will be described below with reference to the drawings.

Figure 10:
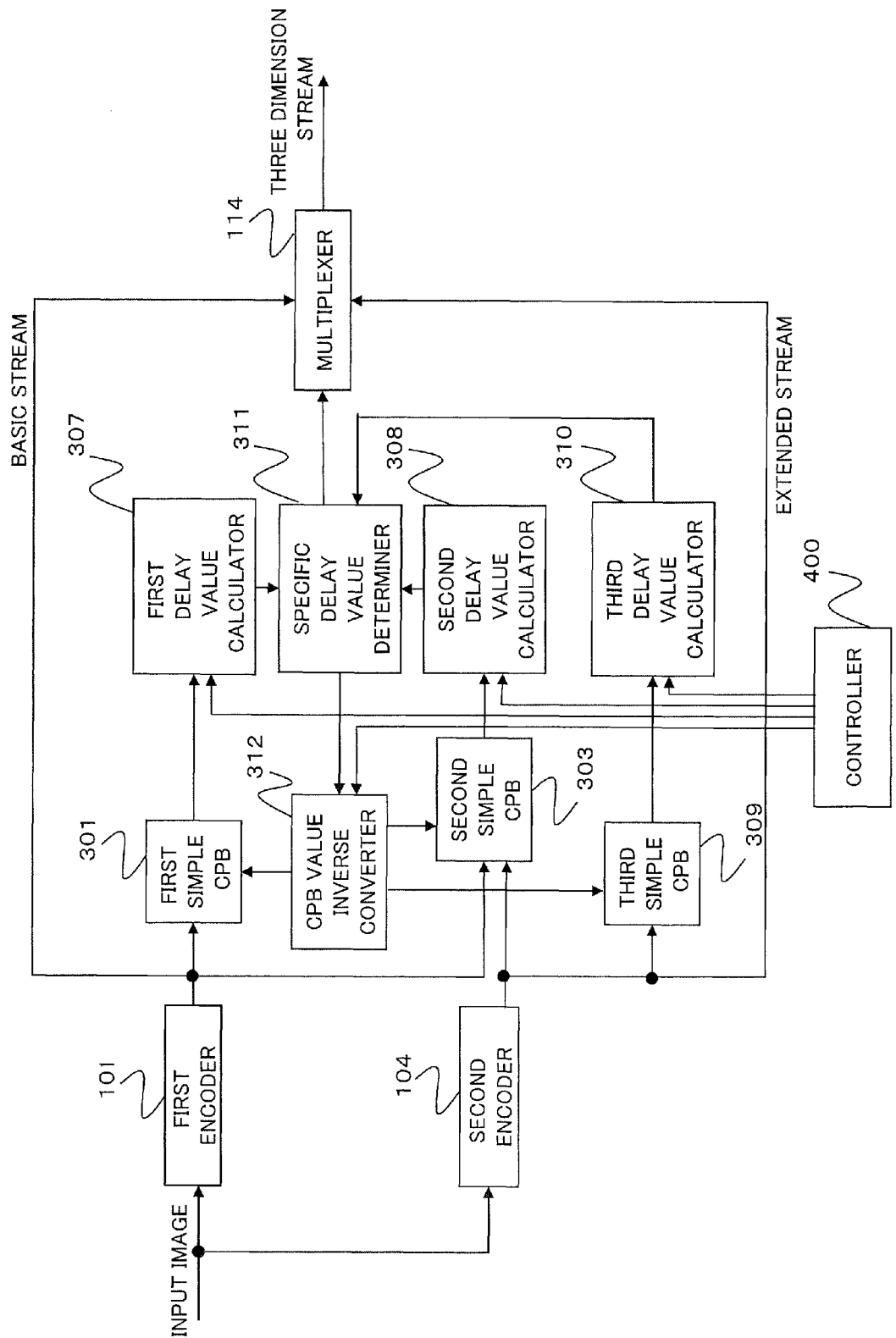
FIG. 10 is a diagram illustrating a configuration of the 3D encoding apparatus according to a fourth embodiment.

FIG. 10 is a diagram illustrating a configuration of the 3D encoding apparatus according to the fourth embodiment. Parts that have same configuration as those in the second embodiment are denoted by the same reference symbols, and detailed description thereof is omitted.

The first simple CPB 301 and the second simple CPB 303 perform the virtual buffer control using the specific cpb value output from the CPB value inverse converter 312 instead of the cpb value output from the CPB value inverse converter 306.

The first delay value calculator 307 basically performs the similar operation to that of the first delay value calculator 302 according to the second embodiment. The first delay value calculator 307 is different from the first delay value calculator 302 according to the second embodiment in that it outputs the calculated delay value to the specific delay value determiner 311.

The second delay value calculator 308 basically performs the similar operation to that of the second delay value calculator 304 according to the second embodiment. The second delay value calculator 308 is different form the second delay value calculator 304 according to the second embodiment in that it outputs the calculated delay value to the specific delay value determiner 311.

A third simple CPB 309 is a virtual buffer for performing the virtual buffer control using the cpb value based on the encoding parameter and the code amount output from the second encoder 104. The encoding parameter represents information about the encoding including syntax information. The code amount is a code amount obtained by actually encoding an input image through the second encoder 104 or a code amount as a predicted value. The third simple CPB 309 calculates the cpb value (hereinafter, "cpb3") in the extended stream. The third simple CPB 309 calculates cpb3(n) of an nth input image according to the following formula.

$$cpb3(n) = cpb3(n-1) + (BR3*T) - b3(n) \quad \text{(Formula 12)}$$

BR3 represents a maximum bit rate of the extended stream, and is, for example, 12 Mbps. T represents an inverse number of a picture rate. In other words, T is a value representing time from an (n−1st) input image to an nth input image included in the extended stream. Further, b3(n) represents a code amount of the nth input image in the extended stream. That is to say, b3(n) is a code amount of the nth input image in the extended stream output from the second encoder 104. The maximum bit rate and the picture rate of the extended stream are given from the controller (not shown) for controlling the 3D encoding apparatus entirely. The maximum bit rate of the extended stream may be a value that changes according to GOPs. Further, fixed maximum bit rates may be given to input images.

The third simple CPB 309 outputs cpb3(n) to the third delay value calculator 310. The third simple CPB 309 outputs cpb3(n) to the third delay value calculator 310 at, for example, the end of GOP.

The third simple CPB 309 uses the cpb value output from the CPB value inverse converter 312 for the virtual buffer control over next GOP. That is to say, in the virtual buffer control over next GOP, a cpb value output form the CPB value inverse converter 306 is used instead of the current cpb value. Even if the current cpb value is replaced, the delay value of the basic stream, the delay value of three dimensional stream and the delay value of the extended stream can be made to be equal to each other by the above operation of the third simple CPB 309 without interrupting the virtual buffer control.

The third delay value calculator 310 calculates the delay value of the extended stream based on cpb3 output from the third simple CPB 309 and the maximum bit rate of the extended stream given from the controller 400 for controlling the 3D encoding apparatus entirely.

The third delay value calculator 310 calculates the delay value of the extended stream based on a relationship of (Formula 10). For example, 3200 bits is given as cpb3, and 12 Mbps is given as the maximum bit rate. In this case, the third delay value calculator 310 calculates the delay value to obtain 0.266 ms according to the (Formula 10).

The third delay value calculator 310 outputs the calculated delay value to the specific delay value determiner 311.

The specific delay value determiner 311 calculates the specific delay value based on the delay values output from the first delay value calculator 307, the second delay value calculator 308 and the third delay value calculator 310. For example, the smallest one of the delay value obtained by the first delay value calculator 307, the delay value obtained by the second delay value calculator 308 and the delay value obtained by the third delay value calculator 310 is output to the CPB value inverse converter 312. The specific delay value determiner 311 may output a smaller value than the smallest one of the delay value obtained by the first delay value calculator 307, the delay value obtained by the second delay value calculator 308 and the delay value obtained by the third delay value calculator 310. The specific delay value determiner 311 outputs the obtained delay value to the CPB value inverse converter 312. The specific delay value determiner 311 outputs the calculated specific delay value to the multiplexer 114.

The CPB value inverse converter 312 calculates the cpb values applied to the first simple CPB 301, the second simple CPB 303 and the third simple CPB 309 based on (1) the specific delay value output from the specific delay value determiner 311, (2) the maximum bit rate of the basic stream, (3) the maximum bit rate of the three dimensional stream and (4) the maximum bit rate of the extended stream, these maximum bit rates from (2) to (4) being given from the controller for controlling the 3D encoding apparatus entirely. The CPB value inverse converter 312 outputs the calculated cpb values to the first simple CPB 301, the second simple CPB 303 and the third simple CPB 309.

For example, the CPB value inverse converter 312 obtains 0.125 ms as the specific delay value from the specific delay value determiner 311. The maximum bit rate of the basic stream is 12 Mbps, the maximum bit rate of the three dimensional stream is 24 Mbps, and the maximum bit rate of the extended stream is 12 Mbps. At this time, the CPB value inverse converter 312 calculates the cpb values to be applied to the first simple CPB 301, the second simple CPB 303 and the third simple CPB 309 according to (Formula 12).

That is to say, the CPB value inverse converter 312 calculates the cpb value to be applied to the first simple CPB 301 to obtain 1500 bits. Further, the CPB value inverse converter 312 calculates the cpb value to be applied to the second simple CPB 303 to obtain 3000 bits. The CPB value inverse converter 312 calculates the cpb value to be applied to the third simple CPB 309 to obtain 1500 bits.

3. Operation

Figure 11:
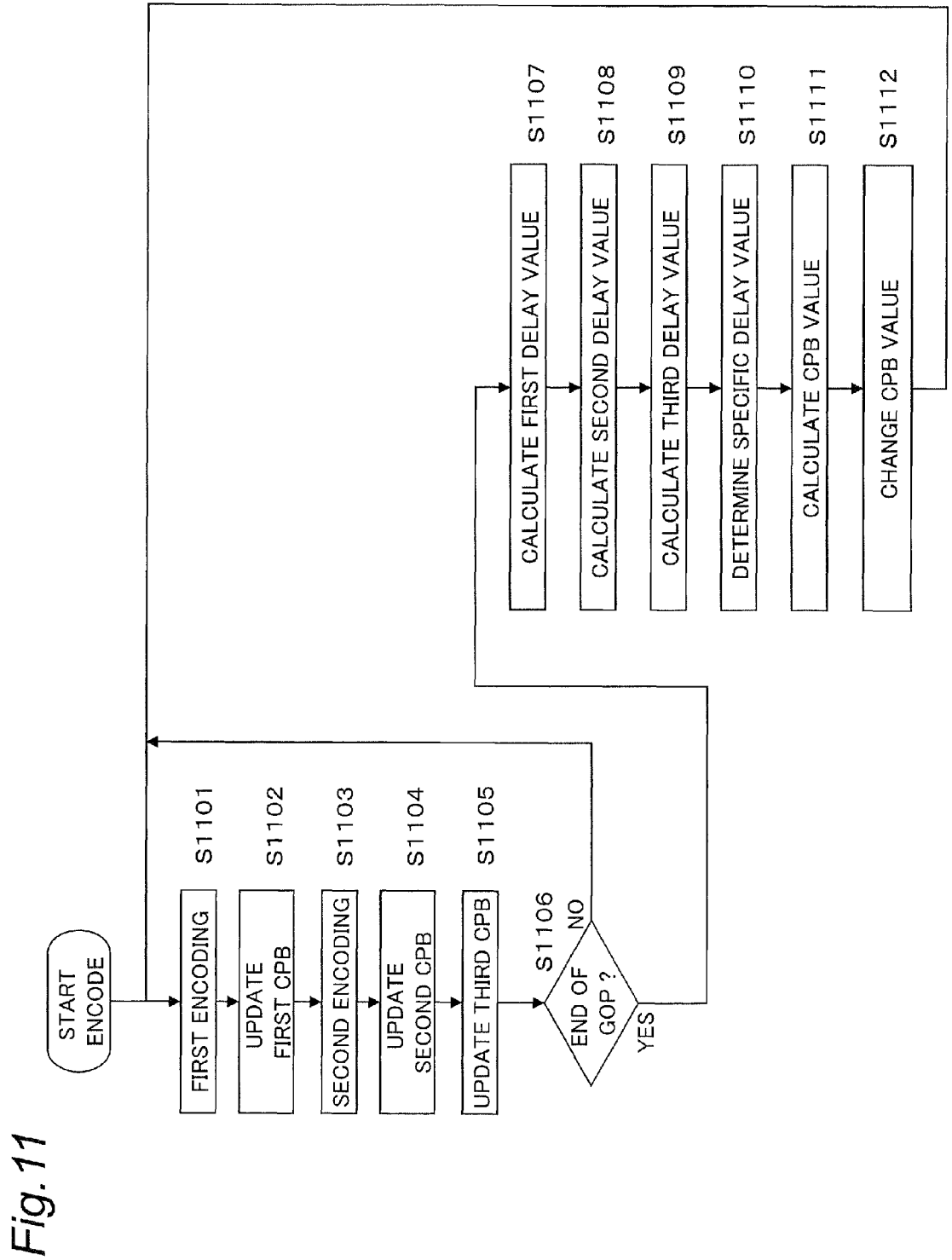
FIG. 11 is a flowchart illustrating one example of an operation of the 3D encoding apparatus according to the fourth embodiment.

One example of the operation of the 3D encoding apparatus according to the fourth embodiment will be described below with reference to a flowchart in FIG. 11.

(Step S1101) When an input image is input, the first encoder 101 encodes the input image to generate a basic stream. The first encoder 101 outputs the generated basic stream to the multiplexer 114. Further, the first encoder 101 outputs a code amount and an encoding parameter of the generated basic stream to the first simple CPB 301 and the second simple CPB 303.

(Step S1102) The first simple CPB 301 performs the virtual buffer control using the cpb value based on the encoding parameter and the code amount of the basic stream generated by the first encoder 101.

(Step S1103) On the other hand, when an input image is input, the second encoder 104 encodes the input image to generate an extended stream. The second encoder 104 outputs the generated extended stream to the multiplexer 114. The second encoder 104 outputs a code amount and an encoding parameter of the generated extended stream to the second simple CPB 303 and the third simple CPB 309.

(Step S1104) The second simple CPB 303 performs the virtual buffer control using the cpb value based on the code amount and the encoding parameter of the basic stream generated by the first encoder 101, and the code amount and the encoding parameter of the extended stream generated by the second encoder 104.

(Step S1105) The third simple CPB 309 performs the virtual buffer control using the cpb value based on the code amount and the encoding parameter of the extended stream generated by the second encoder 104.

(Step S1106) The first encoder 101 and the second encoder 104 determine whether an input image to be encoded is an input image (hereinafter, "terminal image") positioned at the end of GOP. When the determination is made as not being the terminal image, the sequence goes to S1101, and the first encoder 101 and the second encoder 104 encodes residual input images in GOP. When the determination is made as being the terminal image, the first simple CPB 301 outputs the cpb value at the time of the end of GOP to the first delay value calculator 307. Further, the second simple CPB 303 outputs the cpb value at the time of the end of GOP to the second delay value calculator 308. The third simple CPB 309 outputs the cpb value at the time of the end of GOP to the third delay value calculator 310. The process goes to the second delay value calculator 1107.

(Step S1107) The first delay value calculator 307 calculates a delay value (hereinafter, "the first delay value") of the basic stream based on the cpb value output from the first simple CPB 301. The first delay value is not a specific delay value to be actually added to the basic stream. The specific delay value to be actually added is calculated by the specific delay value determiner 311. The first delay value calculator 307 outputs the calculated first delay value to the specific delay value determiner 311.

(Step S1108) The second delay value calculator 308 calculates a delay value (hereinafter, "a second delay value") to be applied to the three dimensional stream based on the cpb value output from the second simple CPB 303. The second delay value is not the specific delay value. The specific delay value to be actually added is calculated by the specific delay value determiner 311. The second delay value calculator 308 outputs the calculated second delay value to the specific delay value determiner 311.

(Step S1109) The third delay value calculator 310 calculates a delay value (hereinafter, "a third delay value") to be applied to the extended stream based on the cpb value output from the third simple CPB 309. The third delay value is not a specific delay value. The specific delay value to be actually added is calculated by the specific delay value determiner 311. The third delay value calculator 310 outputs the calculated third delay value to the specific delay value determiner 311.

(Step S1110) The specific delay value determiner 311 determines the smallest one of the first delay value, the second delay value and the third delay value output from the first delay value calculator 307, the second delay value calculator 308 and the third delay value calculator 310 as the specific delay value, and outputs it to the CPB value inverse converter 312.

(Step S1111) The CPB value inverse converter 312 calculates the cpb values to be used in the first simple CPB 301, the second simple CPB 303 and the third simple CPB 309 based on the specific delay value output from the specific delay value determiner 311. The CPB value inverse converter 312 outputs the calculated cpb values to the first simple CPB 301, the second simple CPB 303 and the third simple CPB 309 respectively.

(Step S1112) Finally, the first simple CPB 301, the second simple CPB 303 and the third simple CPB 309 perform the virtual buffer control over GOP (n+1th GOP) next to GOP (nth GOP) of which specific delay value is obtained based on the cpb value output from the CPB value inverse converter 312.

The above operation flow is one example, and the respective steps can be shuffled. The specific delay value to be generated at S1110 is not limited to the above value, and for example, a smaller delay value than the first delay value, the second delay value and the third delay value output from the first delay value calculator 307, the second delay value calculator 308 and the third delay value calculator 310 may be used as the specific delay value.

4. Conclusion

The 3D encoding apparatus according to the embodiment includes the first encoder 101 and the second encoder 104 that encode input images to generate and output a basic stream and an extended stream, the first simple CPB 301 that performs the buffer simulation of decoding the basic stream, the second simple CPB 303 that performs the buffer simulation of decoding a three dimensional stream obtained based on the basic stream output from the first encoder 101 and the extended stream output from the second encoder 104, the third simple CPB 309 that performs the buffer simulation of decoding the extended stream, the first delay value calculator 307 that calculates a first delay value as a delay value of the basic stream for each GOP based on a result of the buffer simulation performed by the first simple CPB 301, the second delay value calculator 308 that calculates a second delay value as a delay value of the three dimensional stream for each GOP based on a result of the buffer simulation performed by the second simple CPB 303, the third delay value calculator 310 that calculates the third delay value as a delay value of the extended stream for each GOP based on a result of the buffer simulation performed by the third simple CPB 309, and the specific delay value determiner 311 that sets a specific delay value for each GOP based on the first delay value, the second delay value and the third delay value. The specific delay value determiner 113 determines a value not more than the smallest one of the first delay value, the second delay value and the third delay value. The first simple CPB 301, the second simple CPB 303 and the third simple CPB 309 perform the buffer simulation for n+1th GOP based on the specific delay values of nth GOP in the basic stream, the three dimensional stream and the extended stream set by the specific delay value determiner 311. The first simple CPB 301 outputs a buffer accumulation amount in the first simple CPB 301 as a result of the buffer simulation to the first delay value calculator 307. The second simple CPB 303 outputs a buffer accumulation amount in the second simple CPB 303 as a result of the buffer simulation to the second delay value calculator 308. The third simple CPB 309 outputs a buffer accumulation amount in the third simple CPB 309 as a result of the buffer simulation to the third delay value calculator 310.

In such a manner, even when the 3D encoding apparatus according to the fourth embodiment performs the buffer simulation using the buffer accumulation amount, the delay value to be added to the basic stream, the delay value to be added to the three dimensional stream and the delay value to be added to the extended stream can be made to be equal to each other with the simple configuration. As a result, even when the buffer simulation is performed in the simple configuration, the basic stream, the three dimensional stream and the extended stream that meet the BD standard can be generated.

Since the specific delay value is not more than the smallest one of the first delay value, the second delay value and the third delay value, even when the delay values of the first BS, the second BS and the third BS are replaced by the same delay value and the buffer simulation is performed, the basic stream, the three dimensional stream and the extended stream that meet the BD standard can be always generated without interrupting the first BS, the second BS and the third BS.

For, example, when the specific delay value output from a specific delay value determiner 311 is input, the first simple CPB 301 modifies the buffer accumulation amount of the first simple CPB 301 at the input time based on the specific delay value, and performs the buffer simulation for GOP (n+1th GOP) next to GOP (nth GOP) of which specific delay value is obtained. When a specific delay value output from the specific delay value determiner 311 is input, the second simple CPB 303 modifies the buffer accumulation amount of the second simple CPB 303 at the input time based on the specific delay value, and performs the buffer simulation for GOP (n+1th GOP) next to GOP (nth GOP) of which specific delay value is obtained. When a specific delay value output from the specific delay value determiner 311 is input, the third simple CPB 309 modifies the buffer accumulation amount of the third simple CPB 309 at the input time based on the specific delay value, and performs the buffer simulation for GOP (n+1th GOP) next to GOP (nth GOP) of which specific delay value is obtained.

In such a manner, the buffer accumulation amounts in the first simple CPB 301, the second simple CPB 303 and the third simple CPB 309 can be modified according to the setting of the specific delay value in the 3D encoding apparatus. As a result, even when the first delay value, the second delay value and the third delay value are changed into the specific delay value, the 3D encoding apparatus can generate the basic stream and the three dimensional stream that meet the BD standard without interrupting the buffer simulation using the buffer accumulation amount.

Industrial Applicability

The 3D encoding apparatus of the present disclosure can be applied to digital television, video players, personal computers and mobile telephones for encoding video signals.

What is claimed is:

1. A 3D encoding apparatus, comprising:
   an encoder that encodes an input image and generates and outputs a three dimensional stream including a basic stream and an extended stream including a plurality of image groups;
   a first virtual buffer that performs a buffer simulation of decoding the basic stream output from the encoder;
   a second virtual buffer that performs a buffer simulation of decoding the three dimensional stream output from the encoder;
   a first calculator that calculates a first delay value as a delay value of the basic stream for each image group based on a result of the buffer simulation performed by the first virtual buffer,
   a second calculator that calculates a second delay value as a delay value of the three dimensional stream for each image group based on a result of the buffer simulation performed by the second virtual buffer; and
   a setter that sets a specific delay value for each image group based on the calculated first delay value and second delay value, wherein
   the setter sets the specific delay value to a value not more than smaller one of the first delay value and the second delay value,
   the first virtual buffer and the second virtual buffer perform the buffer simulation for n+1th image group based on information about the specific delay value of the nth image group set by the setter in the basic stream and three dimensional stream.

2. The 3D encoding apparatus according to claim 1, wherein the first virtual buffer and the second virtual buffer output information about time at which the input image is encoded as the result of the buffer simulation to the first calculator and the second calculator.

3. The 3D encoding apparatus according to claim 1, wherein
   the first virtual buffer outputs an accumulation amount of data in the first virtual buffer as the result of the buffer simulation to the first calculator, and
   the second virtual buffer outputs an accumulation amount of data in the second virtual buffer as the result of the buffer simulation to the second calculator.

4. The 3D encoding apparatus according to claim 3, wherein
   when the specific delay value output from the setter is input, the first virtual buffer modifies the accumulation amount of the first virtual buffer at the input time of the specific delay value based on information about the specific delay value and performs the buffer simulation for the n+1th image group,
   when the specific delay value output from the setter is input, the second virtual buffer modifies the accumulation amount of the second virtual buffer at the input time of the specific delay value based on information about the specific delay value, and performs the buffer simulation for the n+1th image group.

5. The 3D encoding apparatus according to claim 1, further comprising:
   a third virtual buffer that performs a buffer simulation of decoding the extended stream output from the encoder; and
   a third calculator that calculates a third delay value as a delay value of the extended stream for each image group based on a result of the buffer simulation performed by the third virtual buffer, wherein
   the setter sets the specific delay value for each image group based on the first delay value, the second delay value and the third delay value,
   the setter sets a value not more than the smallest one of the first delay value, the second delay value and the third delay value as the specific delay value, and
   the first virtual buffer, the second virtual buffer and the third virtual buffer perform the buffer simulation for the n+1 image group in the basic stream, the three dimensional stream and the extended stream based on the information about the specific delay value set by the setter.

6. The 3D encoding apparatus according to claim 5, wherein the first virtual buffer, the second virtual buffer and the third virtual buffer output information about the time at which the input image is encoded as results of the buffer simulation to the first calculator, the second calculator and the third calculator, respectively.

7. The 3D encoding apparatus according to claim 5, wherein
   the first virtual buffer outputs an accumulation amount of data in the first virtual buffer as a result of the buffer simulation to the first calculator,
   the second virtual buffer outputs an accumulation amount of data in the second virtual buffer as a result of the buffer simulation to the second calculator, and
   the third virtual buffer outputs an accumulation amount of data in the third virtual buffer as a result of the buffer simulation to the third calculator.

8. The 3D encoding apparatus according to claim 7, wherein
   when the specific delay value output from the setter is input, the first virtual buffer modifies the accumulation amount of the first virtual buffer at the input time of the specific delay value based on information about the specific delay value, and performs the buffer simulation for the n+1th image group, when the specific delay value output from the setter is input, the second virtual buffer modifies the accumulation amount of the second virtual buffer at the input time of the specific delay value based on information about the specific delay value, and performs the buffer simulation for the n+1th image group, and when the specific delay value output from the setter is input, the third virtual buffer modifies the accumulation amount of the third virtual buffer at the input time of the specific delay value based on information about the specific delay value, and performs the buffer simulation for n+1th image group.

9. The 3D encoding apparatus according to claim 1, wherein the basic stream is a stream obtained by encoding one of a left-eye image and a right-eye image in a 3D video, and the extended stream is a stream obtained by encoding the other image in the 3D video in view of a difference between the one image and the other image.

\* \* \* \* \*